(12) United States Patent
Yamaura

(10) Patent No.: US 8,228,884 B2
(45) Date of Patent: *Jul. 24, 2012

(54) WIRELESS COMMUNICATION SYSTEM, WIRELESS COMMUNICATION APPARATUS, WIRELESS COMMUNICATION METHOD, AND COMPUTER PROGRAM

(75) Inventor: Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,779

(22) Filed: Dec. 21, 2010

(65) Prior Publication Data

US 2011/0096729 A1    Apr. 28, 2011

Related U.S. Application Data

(63) Continuation of application No. 11/956,157, filed on Dec. 13, 2007, now Pat. No. 7,881,273, which is a continuation of application No. 11/037,107, filed on Jan. 19, 2005, now Pat. No. 7,400,612.

(30) Foreign Application Priority Data

Feb. 9, 2004    (JP) ................................ 2004-032737

(51) Int. Cl.
   *H04W 4/00* (2009.01)
   *H04J 1/00* (2006.01)
   *H04L 12/28* (2006.01)
   *H04L 12/413* (2006.01)
   *H04B 1/00* (2006.01)
   *H04B 17/00* (2006.01)

(52) U.S. Cl. ........ 370/338; 370/343; 370/431; 370/446; 455/63.1; 455/67.13

(58) Field of Classification Search .................... 342/52, 342/57, 70; 370/310, 338, 343, 347, 431, 370/445; 455/63.1, 67.13, 500, 509
See application file for complete search history.

(56) References Cited

U.S. PATENT DOCUMENTS

| | | | |
|---|---|---|---|
| 6,697,013 B2 | 2/2004 | McFarland et al. | |
| 6,738,599 B2 | 5/2004 | Black et al. | |
| 6,744,766 B2 * | 6/2004 | Alapuranen | 370/394 |
| 6,870,815 B2 | 3/2005 | McFarland et al. | |

(Continued)

FOREIGN PATENT DOCUMENTS

| | | |
|---|---|---|
| EP | 1 250 640 B1 | 10/2002 |
| EP | 1298949 A1 | 4/2003 |
| JP | 2001-103570 | 4/2001 |
| JP | 2003-229782 | 8/2003 |
| JP | 2003-523696 | 8/2003 |

(Continued)

OTHER PUBLICATIONS

"IEEE 802.11h: Amendment 5: Spectrum and Transmit Power Management Extensions in the 5 GHz band in Europe", IEEE Standards 802.11H, XP-002292634, Oct. 14, 2003, 3 cover pages, p. iii-xiv, and pp. 1-59.

*Primary Examiner* — Nathan Mitchell
(74) *Attorney, Agent, or Firm* — Oblon, Spivak, McClelland, Maier & Neustadt, L.L.P.

(57) ABSTRACT

Disclosed is radar wave detection and DFS (dynamic frequency selection) with high efficiency while considering, for instance, the power consumption of each communication station within an autonomous distributed network. At least one communication station runs in an interference avoidance operation mode, operates a radar wave detection section, and fulfills the obligation to issue instructions for radar wave detection and DFS for an approximately predetermined period of time. After the lapse of the approximately predetermined period of time, another communication station switches to the interference avoidance operation mode and assumes the obligation to issue instructions for radar wave detection and DFS. In other words, two or more communication stations sequentially run in the interference avoidance operation mode in a time sharing manner. Therefore, the average power consumption of the communication stations decreases.

13 Claims, 27 Drawing Sheets

U.S. PATENT DOCUMENTS

| | | |
|---|---|---|
| 7,107,032 B2 | 9/2006 | Li |
| 2001/0031626 A1 | 10/2001 | Lindskog et al. |
| 2004/0033789 A1 | 2/2004 | Tsien |
| 2005/0054294 A1* | 3/2005 | Khun-Jush et al. .......... 455/63.1 |
| 2006/0082489 A1 | 4/2006 | Liu et al. |
| 2006/0199587 A1 | 9/2006 | Hansen |

FOREIGN PATENT DOCUMENTS

| | | |
|---|---|---|
| JP | 2005-512436 | 4/2005 |
| WO | WO 01/61441 A1 | 8/2001 |
| WO | WO 03/001742 A1 | 1/2003 |
| WO | WO 03/047290 A1 | 6/2003 |
| WO | WO 03/090487 A1 | 10/2003 |

* cited by examiner

F I G. 1
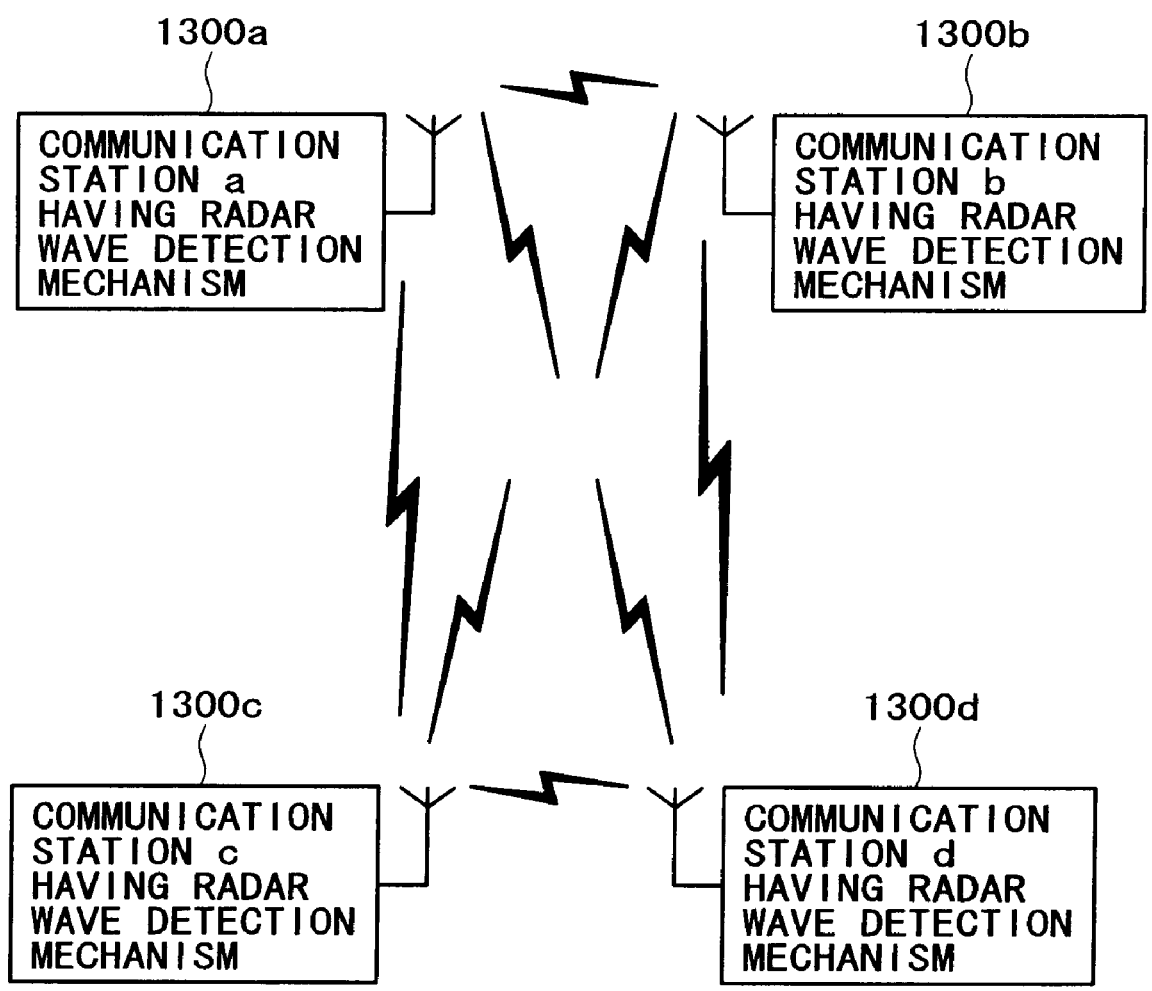

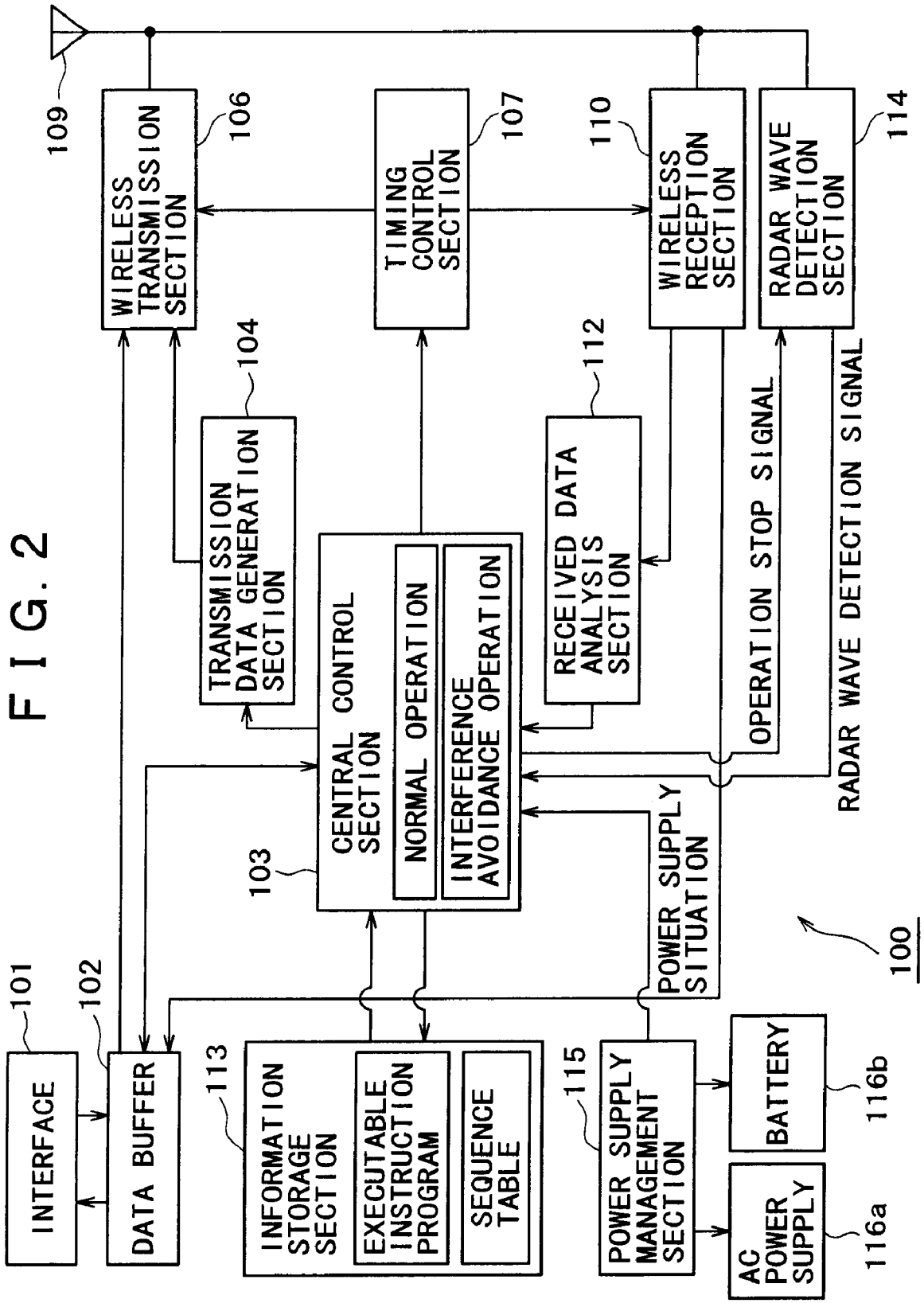

FIG. 8

UNUPDATED TABLE

| OBLIGATION TRANSFER ORDER | MOBILE STATION ID | POWER SUPPLY SITUATION |
|---|---|---|
| 1 | 10.83.05 | BATTERY POWERED |
| 2 | 10.83.62 | BATTERY POWERED |
| 3 | 10.83.03 | BATTERY POWERED |
| 4 | 10.83.89 | AC POWERED |
| 5 | 10.83.44 | BATTERY POWERED |

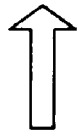

UPDATED TABLE

| OBLIGATION TRANSFER ORDER | MOBILE STATION ID | POWER SUPPLY SITUATION |
|---|---|---|
| 1 | 10.83.05 | BATTERY POWERED |
| 2 | 10.83.62 | BATTERY POWERED |
| 3 | 10.83.89 | AC POWERED |
| 4 | 10.83.44 | BATTERY POWERED |

AC-POWERED TERMINAL DEVICE HAVING ID OF 10.83.03 HAS BECOME DISASSOCIATED FROM NETWORK

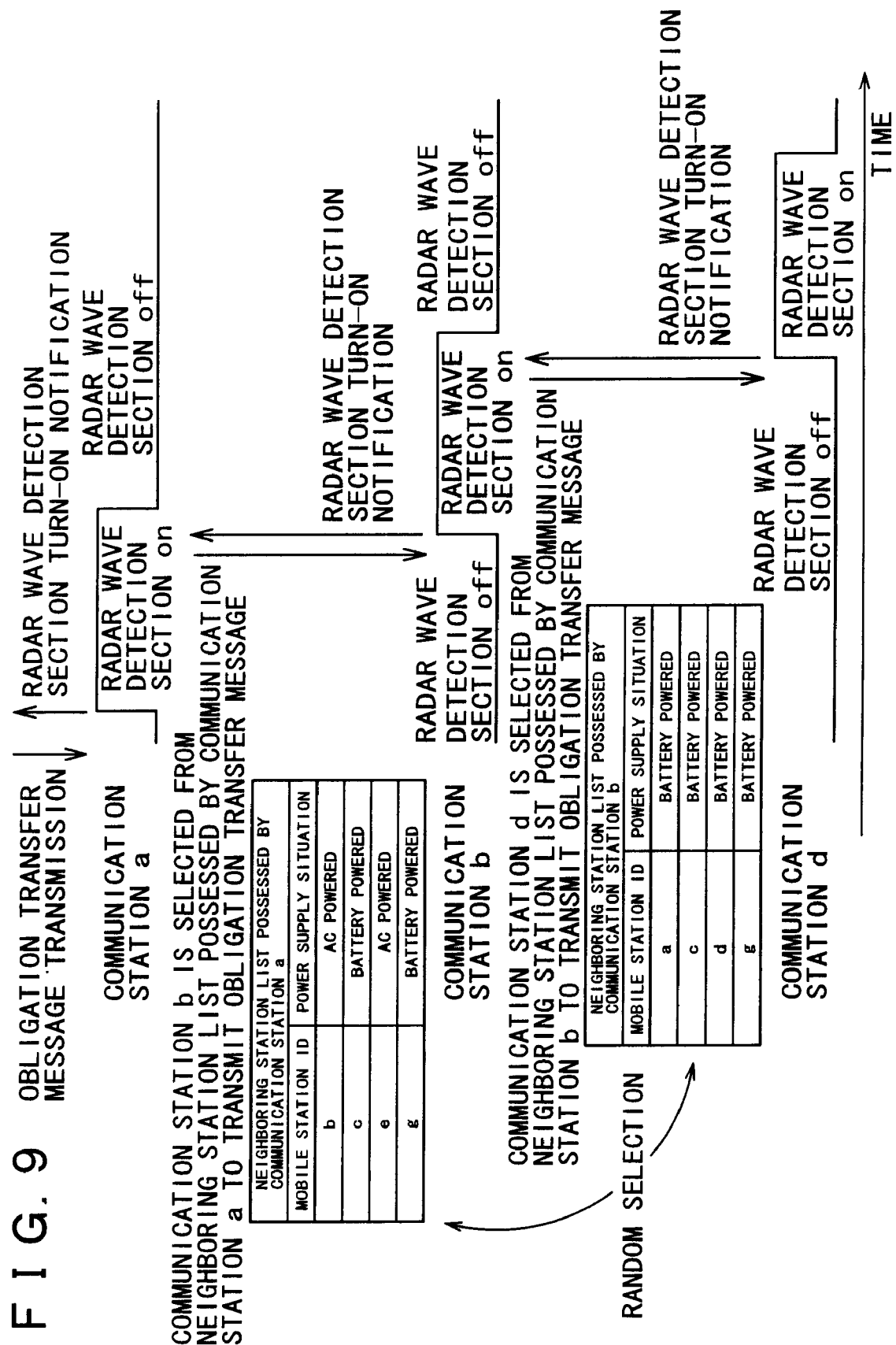

FIG. 10

UNUPDATED TABLE

| OBLIGATION TRANSFER ORDER | MOBILE STATION ID | POWER SUPPLY SITUATION |
|---|---|---|
| 1 | 10.83.05 | BATTERY POWERED |
| 2 | 10.83.62 | BATTERY POWERED |
| 3 | 10.83.03 | BATTERY POWERED |
| 4 | 10.83.89 | AC POWERED |
| 5 | 10.83.44 | BATTERY POWERED |

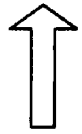

UPDATED TABLE

| OBLIGATION TRANSFER ORDER | MOBILE STATION ID | POWER SUPPLY SITUATION |
|---|---|---|
| 1 | 10.83.05 | BATTERY POWERED |
| 2 | 10.83.62 | BATTERY POWERED |
| 3 | 10.83.03 | BATTERY POWERED |
| 4 | 10.83.89 | BATTERY POWERED |
| 5 | 10.83.44 | BATTERY POWERED |

TABLE IS UPDATED BECAUSE POWER SUPPLY SITUATION OF STATION HAVING ID OF 10.83.89 IS CHANGED FROM AC POWER SUPPLY TO BATTERY.

FIG. 11

UNUPDATED TABLE

| OBLIGATION TRANSFER ORDER | MOBILE STATION ID | POWER SUPPLY SITUATION | |
|---|---|---|---|
| 1 | 10.83.05 | BATTERY POWERED | 10 min |
| 2 | 10.83.62 | BATTERY POWERED | 10 min |
| 3 | 10.83.03 | BATTERY POWERED | 10 min |
| 4 | 10.83.89 | AC POWERED | 2 hr |
| 5 | 10.83.44 | BATTERY POWERED | 10 min |

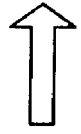

UPDATED TABLE

| OBLIGATION TRANSFER ORDER | MOBILE STATION ID | POWER SUPPLY SITUATION | |
|---|---|---|---|
| 1 | 10.83.05 | BATTERY POWERED | 10 min |
| 2 | 10.83.62 | BATTERY POWERED | 5 min |
| 3 | 10.83.03 | BATTERY POWERED | 10 min |
| 4 | 10.83.89 | AC POWERED | 2 hr |
| 5 | 10.83.44 | BATTERY POWERED | 10 min |

REPORT IS MADE TO INDICATE THAT OBLIGATION TIME IS CHANGED BECAUSE REMAINING BATTERY POWER IS DECREASED DUE TO CHANGE IN POWER SUPPLY SITUATION OF STATION HAVING ID OF 10.83.62 THEREFORE, TABLE IS UPDATED.

F I G. 1 2

| NEIGHBORING STATION LIST POSSESSED BY COMMUNICATION STATION a ||
|---|---|
| MOBILE STATION ID | POWER SUPPLY SITUATION |
| b | BATTERY POWERED |
| c | BATTERY POWERED |
| e | AC POWERED |
| g | BATTERY POWERED |

F I G. 1 3
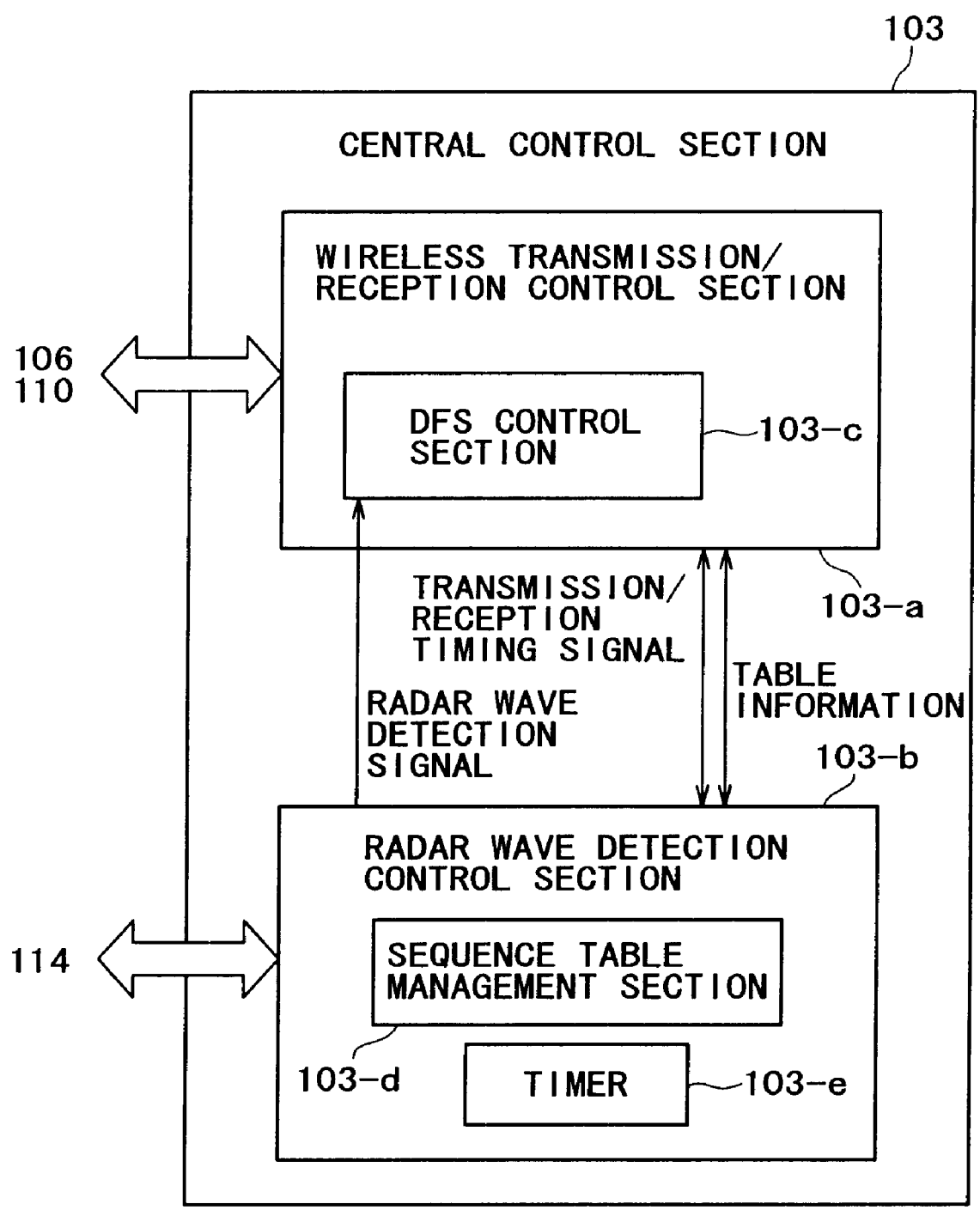

F I G. 1 7
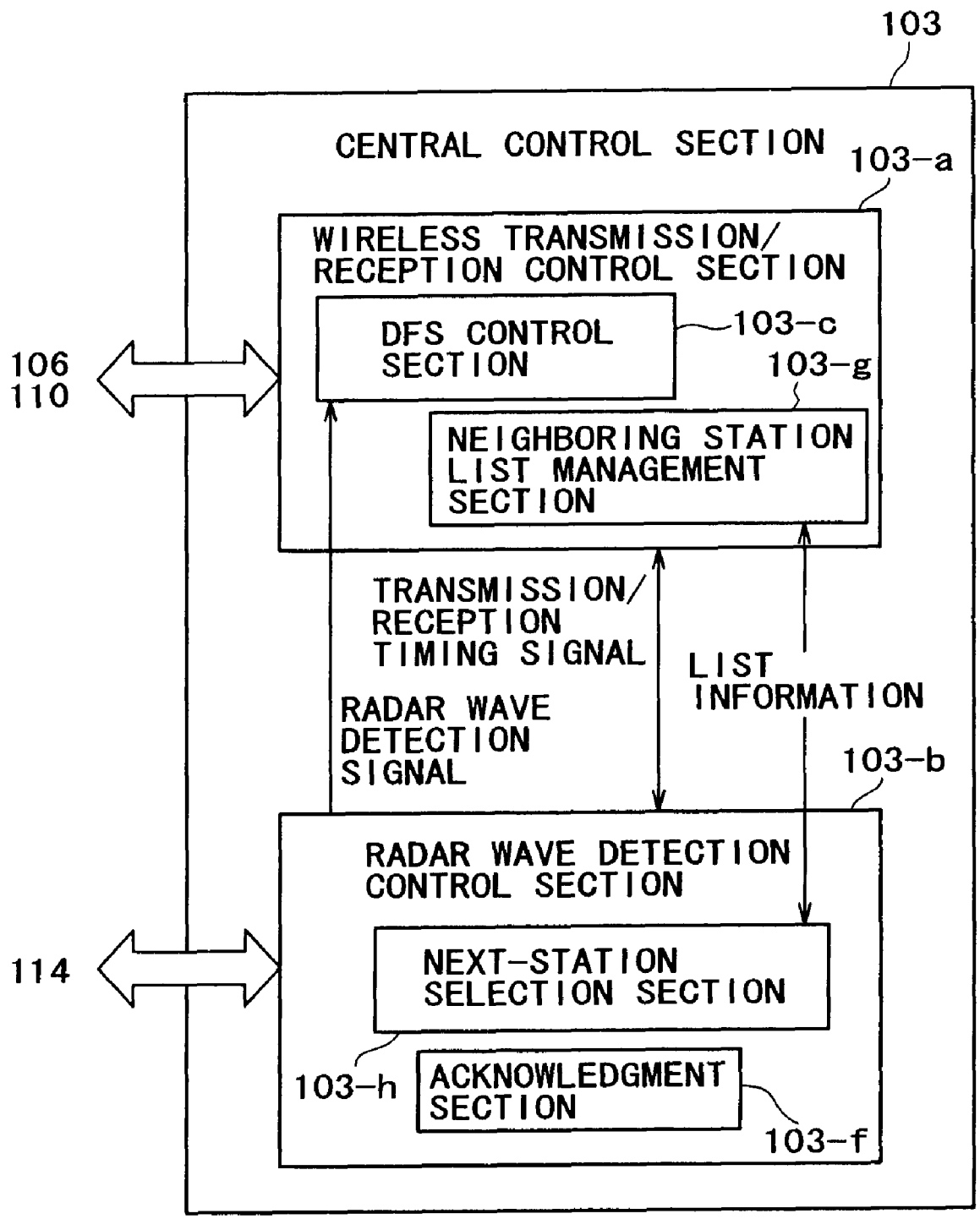

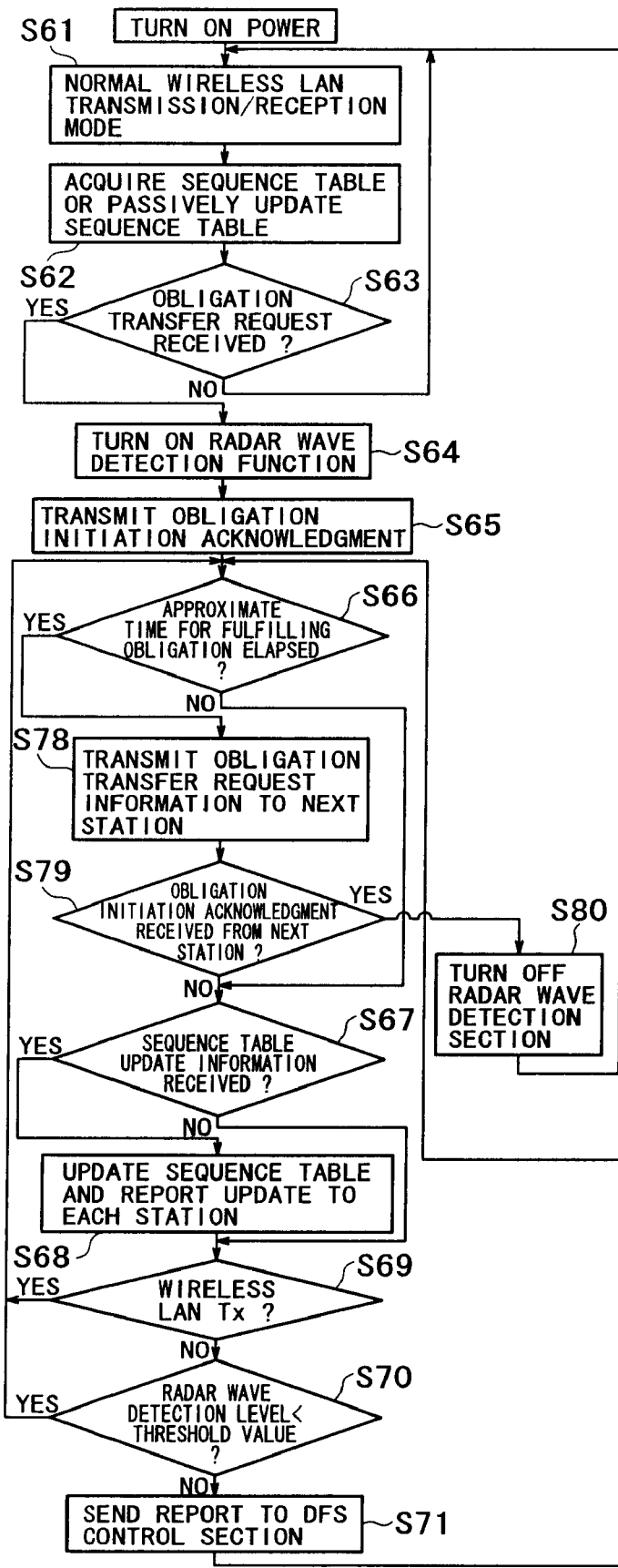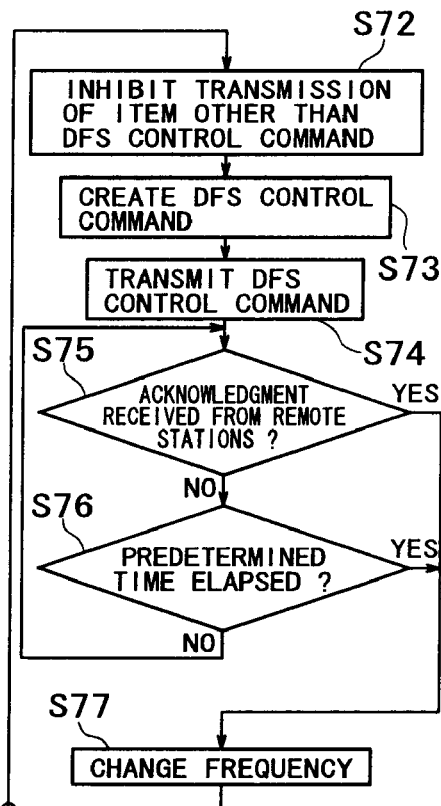
FIG. 20

F I G. 2 5
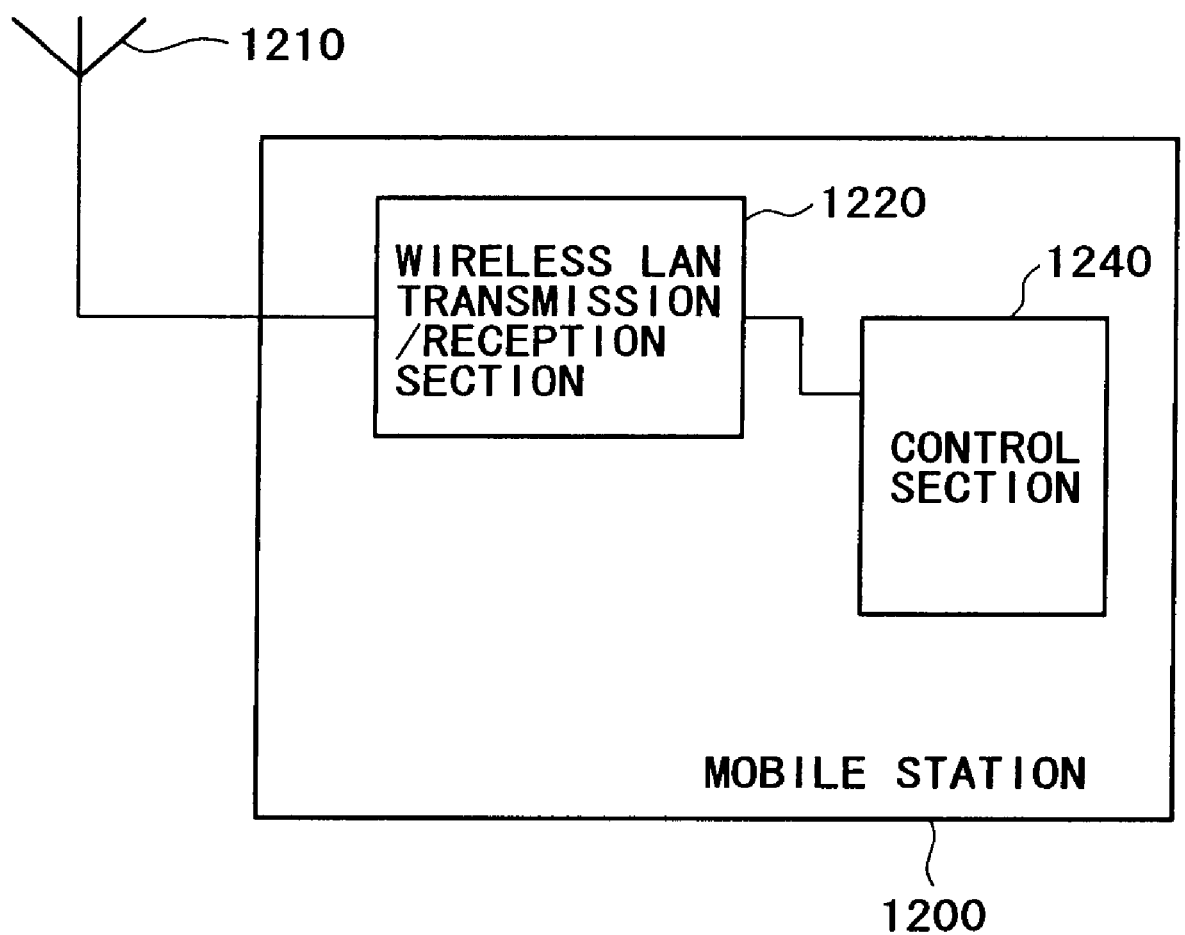

WIRELESS COMMUNICATION SYSTEM, WIRELESS COMMUNICATION APPARATUS, WIRELESS COMMUNICATION METHOD, AND COMPUTER PROGRAM

CROSS-REFERENCE TO RELATED APPLICATIONS

This application is a continuation of U.S. application Ser. No. 11/956,157, filed Dec. 13, 2007, which is a continuation of U.S. application Ser. No. 11/037,107, filed Jan. 19, 2005, and is based upon and claims benefit of priority from Japanese Patent Application No. 2004-032737, filed Feb. 9, 2004, the entire contents of each of which is incorporated herein by reference.

BACKGROUND OF THE INVENTION

The present invention relates to a wireless communication system, wireless communication apparatus, wireless communication method, and computer program for establishing communication among a plurality of wireless stations that constitute, for instance, a wireless LAN (Local Area Network), and more particularly to a wireless communication system, wireless communication apparatus, wireless communication method, and computer program for allowing various communication stations to perform network operations in an autonomous distributed manner without using any specially installed control station.

More specifically, the present invention relates to a wireless communication system, wireless communication apparatus, wireless communication method, and computer program for sharing the same frequency band with a radar wave system by making a frequency change (DFS: Dynamic Frequency Selection) in response to a radar wave detection in an autonomous distributed communication environment, and more particularly to a wireless communication system, wireless communication apparatus, wireless communication method, and computer program for efficiently detecting a radar wave and making a frequency change (dynamic frequency selection) in an autonomous distributed network while considering, for instance, the power consumption of each communication station.

In recent years, the demand for a wireless LAN system has remarkably increased because its increased speed and reduced price. Especially, the introduction of a personal area network (PAN) is recently studied in order to provide information communication by establishing a small-scale wireless network among a plurality of electronic devices existing around a person. For example, different wireless communication systems are defined by using a 2.4 GHz, 5 GHz, or other frequency band that does not require licensing from a supervisory authority.

Typical standards concerning wireless networks are IEEE (The Institute of Electrical and Electronics Engineers) 802.11 (refer, for instance, to Non-patent Document 1), HiperLAN/2 (refer, for instance, to Non-patent Document 2 or 3), and IEEE 302.15.3, Bluetooth. As regards the IEEE 802.11 standard, there are extended standards such as IEEE 802.11a (refer, for instance, to Non-patent Document 4), IEEE 802.11b, and IEEE 802.11g, which apply depending on the employed wireless communication method and frequency band.

To configure a local area network by using a wireless technology, one control station apparatus called an "access point" or "coordinator" is generally installed within an area so that a network is formed under the overall control of the control station.

When a certain information apparatus transmits information to a remote apparatus within a wireless network in which an access point is installed, a band reservation based access control method is widely used. When such a method is used, a band required for information transmission is reserved at the access point so as to use a transmission path while avoiding collision with an information transmission by another communication apparatus. In other words, the access point is installed so as to provide synchronous wireless communication in which communication apparatuses within the wireless network synchronize with each other.

However, when asynchronous communication is to be established between a transmitting communication apparatus and a receiving communication apparatus in a wireless communication system in which an access point exists, wireless communication via the access point is essential. It means that the transmission path use efficiency is reduced to half.

Meanwhile, an "ad-hoc communication" method is devised as a wireless network configuration method. When this method is used, terminal devices establish wireless communication directly and asynchronously. Particularly in a small-scale wireless network comprising a relatively small number of clients that are located in the vicinity of each other, the use of the ad-hoc communication method seems appropriate because wireless communication can be established directly and asynchronously by any terminal devices without using a specific access point.

In an IEEE 802.11 wireless LAN system, for instance, IEEE 802.11 networking is based on the concept of BSS (Basic Service Set). There are two types of BSSs. One BSS is defined by an "infra mode" in which an AP (Access Point: control station) or other master exists. The other one is IBSS (Independent BSS), which is defined by an "ad-hoc mode" in which only a plurality of MTs (Mobile Terminals: mobile stations) exist. In the ad-hoc mode, a peer-to-peer operation is performed in an autonomous distributed manner even when no control station is provided. When a beacon transmission time has come, each terminal device performs random period counting. The local terminal device transmits a beacon if it does not receive the beacon of a remote terminal device before the counting ends.

In an ad-hoc wireless communication system, no central control station exists. Therefore, the ad-hoc wireless communication system is suitable for configuring a home network that comprises, for instance, electrical home appliances. The ad-hoc network does not readily fail because it automatically changes the routing even when one electrical home appliance becomes faulty or turns off. Further, the ad-hoc network can transmit data to a relatively remote location without lowering a high data rate by hopping packets multiple times between mobile stations. There are various known examples of a developed ad-hoc system (refer, for instance, to Non-patent Document 5).

The IEEE 802.11a system operates in a 5 GHz band (5.15 to 5.35 GHz and 5.47 to 5.825 GHz). It uses the same frequency band as for meteorological radar waves. Therefore, recommendation ITU-R SA. 1632 is made by the WRC-03 conference, which determines international radio frequency allocations. The recommendation stipulates that a frequency band equivalent to a radar wave be shared by requiring the wireless LAN side to avoid radar wave interference. More specifically, it is required that a wireless LAN access point using a 5.25-5.35 GHz/5.47-5.725 GHz band have a radar wave detection function, notify all controlled mobile stations, upon radar wave detection, of a change in the employed frequency, and cause a change in the employed frequency. This frequency change operation is referred to as a DFS (Dynamic Frequency Selection).

A sequence of radar wave detection and DFS related operations will now be described with reference to FIGS. 23 through 25.

FIG. 23 shows a typical configuration of a wireless LAN network. In the example shown in FIG. 23, the network comprises one access point 1110 and four mobile stations 1200. It is assumed that the mobile stations 1200a-1200d communicate with the access point 1100 and are controlled by the access point 1100. All communications are provided via the access point. Even when mobile stations 1200a and 1200b establish data communication, it is established via the access point.

FIG. 24 schematically shows a typical functional configuration of the access point 1100. To achieve radar wave detection, the access point 1100 incorporates a radar wave detection section 1130. The radar wave detection section 1130 keeps on checking for an incoming radar wave at almost all times (except for a period during which the local station is engaged in transmission). If a predetermined threshold value is exceeded by detected radar wave strength, the radar wave detection section 1130 notifies a control section 1140 of such an event. Upon receipt of such a notification, the control section 1140 creates command data for causing its controlled mobile stations 1200 to apply a frequency change, modulates the command data, and transmits the resulting radio signal to a wireless LAN transmission/reception section 1120 via an antenna 1110. The changed frequency channel number data is written within the command data.

FIG. 25 schematically shows a typical functional configuration of a mobile station 1200. The mobile station 1200 shown in the figure receives the transmitted radio signal with an antenna 1210, demodulates the radio signal with a wireless LAN transmission/reception section 1220, and conveys the received command data to a control section 1240. The control section 1240 creates response data for acknowledging the receipt of the command data, causes the wireless LAN transmission/reception section 1220 to modulate the command data, and transmits the resulting radio signal from the antenna 1210.

The access point 1100 uses the antenna 1110 to receive the radio signal from the mobile station 1200, causes the wireless LAN transmission/reception section 1120 to demodulate the radio signal, and conveys acknowledgment data from the mobile station 1200 to the control section 1140.

When the acknowledgment is received from each mobile station 1200, the access point 1100 changes the setting for the wireless LAN transmission/reception section 1120 to transmit/receive a frequency corresponding to the previously reported frequency channel number, and begins to perform a transmission/reception operation on a new frequency channel.

When the wireless LAN transmission/reception section 1220 detects that a periodic beacon from the access point 1100 cannot be received, the mobile station 1200 notifies the control section 1240 that such a periodic beacon cannot be received. Upon receipt of such a notification, the control section 1240 changes the setting for the wireless LAN transmission/reception section 1220 so as to transmit/receive a frequency corresponding to the previously reported, changed frequency channel data, and begins to perform a reception operation on a new frequency channel.

The above example of a radar wave detection/DFS function operation is a typical implementation in the infra mode in which a network operation is performed under the control of one access point. As is obvious from the comparison between FIGS. 24 and 25, the access point side performs the radar wave detection and DFS operations in an integrated fashion. The mobile station side is not equipped with a radar wave detection section.

Some technologies for avoiding radar wave interference in a network were already proposed (refer, for instance, to Patent Documents 1, 2, 3, and 4). All these technologies relate to a radar wave detection method for use in a network where an access point exists, that is, for use in the infra mode, or to a method for changing the frequency to avoid interference from a detected radar wave. In a system comprising an access point and a plurality of mobile stations, for instance, a "hidden base station" problem may arise so that a radar wave reaches the mobile stations but does not reach the access point. However, when a radar detection apparatus is installed in addition to the access point, it is possible to solve the "hidden base station" problem for radar waves (refer, for instance, to Patent Document 3).

Meanwhile, the aforementioned ad-hoc wireless communication system, in which each communication station operates in an autonomous distributed manner while no access point or base station is installed, has attracted a great deal of attention in recent years. However, no radar wave detection/interference avoidance technology has been developed for use in such an ad-hoc wireless communication system.

When, for instance, every communication station incorporates a radar wave detection section and constantly exercises its radar wave detection function, it is possible to avoid interference in an autonomous distributed manner. In this instance, however, it is necessary to supply electrical power to each communication station for radar wave detection purposes. Therefore, the overall system power consumption increases. At a battery-powered mobile station, for instance, the operating time decreases due to power consumption for radar wave detection so that the degree of user-friendliness decreases. To maintain an adequate length of operating time while the radar wave detection function is being exercised, there is no alternative but to increase the battery capacity. However, such an increase in the battery capacity goes against the trend toward reducing the device size, weight, and price.

[Patent Document 1] Japanese Patent No. 3461779

[Patent Document 2] Japanese Patent JP-A No. 300102/2002

[Patent Document 3] Japanese Patent JP-A No. 135831/2002

[Patent Document 4] Japanese Patent JP-A No. 285301/2001

[Non-patent Document 1] International Standard ISO/IEC 8802-11:1999 (E) ANSI/IEEE Std 802.11, 1999 Edition, Part II: Wireless LAN Medium Access Control (MAC) and Physical Layer (PHY) Specifications

[Non-patent Document 2] ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-patent Document 3] ETSI TS101 761-2 V1.3.1 Broadband Radio Access Networks (BRAN); HIPERLAN Type 2; Data Link Control (DLC) Layer; Part 2: Radio Link Control (RLC) sublayer

[Non-patent Document 4] Supplement to IEEE Standard for Information technology—Telecommunications and information exchange between systems—Local and metropolitan area networks—Specific requirements—Part II: Wireless LAN Medium Access Control (MAC) and Physical Layer (PHY) specifications: High-speed Physical Layer in the 5 GHz Band

[Non-patent Document 5] C. K. Tho, "Ad Hoc Mobile Wireless Network" (Prentice Hall PTR)

SUMMARY OF THE INVENTION

An object of the present invention is to provide an excellent wireless communication system, wireless communication apparatus, wireless communication method, and computer program for allowing each communication station to perform a preferred network operation in an autonomous distributed manner without using any specific control station.

Another object of the present invention is to provide an excellent wireless communication system, wireless communication apparatus, wireless communication method, and computer program for sharing the same frequency band with a radar wave system by making a dynamic frequency selection (DFS) in response to a radar wave detection in an autonomous distributed communication environment.

Yet another object of the invention is to provide an excellent wireless communication system, wireless communication apparatus, wireless communication method, and computer program for efficiently detecting a radar wave and making a dynamic frequency selection in an autonomous distributed network while considering, for instance, the power consumption of each communication station.

The present invention has been made to solve the above problems. In a first aspect of the present invention, a wireless communication system comprises two or more communication stations for transmitting/receiving a signal within a frequency band that requires radar wave detection. The two or more communication stations operate while switching between an interference avoidance operation mode for detecting a radar wave and instructing various stations to change the employed carrier frequency (DFS) in accordance with a radar wave detection and a normal operation mode for performing a communication operation while changing the employed carrier frequency in compliance with a remote station's instruction for a change in the employed carrier frequency.

The above "system" refers to a logical aggregate of a plurality of apparatuses (or functional modules implementing a specific function). It does not matter whether the apparatuses or functional modules are within a single housing.

In an ad-hoc wireless communication system according to the present invention, which comprises a plurality of communication stations having a radar wave detection section, at least one communication station is obliged to run in the interference avoidance operation mode, operate the radar wave detection section, and issue instructions for radar wave detection and DFS for an approximately predetermined period of time. After the lapse of the approximately predetermined period of time, at least another communication station is obliged to switch to the interference avoidance operation mode and issue instructions for radar wave detection and DFS. In other words, at least two communication stations operate in the interference avoidance operation mode in a time sharing manner. Therefore, it is possible to reduce the average power consumption of the communication stations.

For example, the communication stations within the wireless communication system may sequentially operate, one at a time, in the interference avoidance operation mode to achieve radar wave detection and DFS. Each communication station operating in the interference avoidance operation mode in a time sharing manner may retain a sequence table, which describes the order in the communication stations operate in the interference avoidance operation mode, to ensure that at least one communication station operates in the interference avoidance operation mode at all times.

In the wireless communication system, a first communication station, which currently operates in the interference avoidance operation mode, may notify a second communication station, which currently operates in the normal operation mode, that the second communication station should subsequently operate in the interference avoidance operation mode. Upon receipt of an acknowledgment from the second communication station, the first communication station may switch from the interference avoidance operation mode to the normal operation mode.

Alternatively, in the wireless communication system, the first communication station, which currently operates in the interference avoidance operation mode, may notify a second communication station, which currently operates in the normal operation mode, that the second communication station should subsequently operate in the interference avoidance operation mode. Upon receipt of a notification that the second communication station has switched to the interference avoidance operation mode, the first communication station may switch from the interference avoidance operation mode to the normal operation mode.

When a procedure for transferring the obligation to perform an interference avoidance operation between the communication stations is clearly established as described above so that a communication station in the interference avoidance operation mode stops its interference avoidance operation upon receipt of an acknowledgment, it is possible to avoid an untoward situation where no communication station achieve radar wave detection.

The sequence table may contain the power supply situation information about each communication station so that the time of operating in the interference avoidance operation mode is variously allocated to the communication stations in accordance with the power supply situation information. For example, the information contained in the sequence table may indicate whether each communication station is AC powered or battery powered. Further, a longer time of operating in the interference avoidance operation mode may be allocated to an AC-powered communication station than to a battery-powered communication station because the former station has a relatively large power supply capacity.

Within the system, a communication station currently running in the interference avoidance operation mode may manage the sequence table in an integrated fashion. More specifically, when a network configuration change is detected, a communication station running in the normal operation mode sends the associated report to a remote station. Upon detection of a network configuration change or upon receipt of the above report from a remote station, the communication station running in the interference avoidance operation mode updates the contents of the sequence table.

A battery-powered communication station may make a report when the amount of its remaining battery power is changed. Upon receipt of such a report from a remote station, a communication station running in the interference avoidance operation mode updates the contents of the sequence table. Further, the time of operating in the interference avoidance operation mode may be reduced to lessen the power supply load on a communication station whose remaining battery power is low.

In the wireless communication system according to the present invention, at least one communication station within the network is obliged to run in the interference avoidance operation mode, operate the radar wave detection section, and issue instructions for radar wave detection and DFS for an approximately predetermined period of time. In such an instance, the communication stations mutually check whether they are battery powered or AC powered.

If an AC-powered communication station exists within the network, it is preferentially obliged to issue instructions for radar wave detection and DFS. Therefore, it is possible to reduce the average power consumption of battery-powered communication stations.

If an AC-powered communication station exists within the network, it may alternatively be obliged to issue instructions for radar wave detection and DFS for a sufficiently longer period of time than a battery-powered communication station. At least one communication station within the network is obliged to operate the radar wave detection section and issue instructions for radar wave detection and DFS for an approximately predetermined period of time. After the lapse of the approximately predetermined period of time, at least another communication station is obliged to issue instructions for radar wave detection and DFS. As a result, it is possible to reduce the average power consumption of battery-powered communication stations.

Further, if a communication station whose remaining battery power is reduced is obliged to issue instructions for radar wave detection and DFS for a relatively short period of time while a communication station whose remaining battery power is not reduced is obliged to issue the instructions for a relatively long period of time, it is possible to reduce the average power consumption of battery-powered communication stations.

In a second aspect of the present invention, a computer program is written in computer readable form to exercise wireless communication operation control on a computer system for the purpose of transmitting/receiving a signal within a frequency band that requires radar wave detection. A plurality of carrier frequencies are available. The computer program comprises a radar wave detection step for monitoring for a radar wave at a currently used carrier frequency; and a communication control step for controlling a communication operation either in an interference avoidance operation mode for detecting a radar wave and instructing various stations to change the employed carrier frequency in accordance with a radar wave detection or in a normal operation mode for performing a communication operation while changing the employed carrier frequency in compliance with a remote station's instruction for a change in the employed carrier frequency.

The computer program according to the second aspect of the present invention represents a definition of a computer program that is written in computer readable form to perform a predefined process on a computer system. In other words, when the computer program according to the second aspect of the present invention is installed on a computer system, the computer system cooperatively functions and operates as a wireless communication apparatus. When a plurality of such wireless communication apparatuses are started up to establish a wireless network, it is possible to obtain the same advantages as those of the wireless communication system according to the first aspect of the present invention.

The present invention makes it possible to provide an excellent wireless communication system, wireless communication apparatus, wireless communication method, and computer program for sharing the same frequency band with a radar wave system by making a dynamic frequency selection (DFS) in response to a radar wave detection in an autonomous distributed communication environment.

The present invention also makes it possible to provide an excellent wireless communication system, wireless communication apparatus, wireless communication method, and computer program for efficiently detecting a radar wave and making a dynamic frequency selection in an autonomous distributed network while considering, for instance, the power consumption of each communication station.

When various communication stations achieve radar wave detection in a time sharing manner within an autonomous distributed wireless communication system according to the present invention, which operates in a frequency band that requires radar wave detection, the average power consumption of the communication stations can be reduced. As a result, it is possible to provide a small-size, low-priced, ad-hoc wireless communication system or communication apparatus.

When the procedure for transferring the obligation to perform an interference avoidance operation for issuing instructions for radar wave detection and frequency change (DFS) between the communication stations is acknowledged by a communication station in accordance with the present invention, it is possible to avoid a period of time during which no radar wave detection is attempted within the entire system. As a result, it is possible to prevent radar wave interference with increased certainty.

According to the present invention, a communication station that is obliged to perform an interference avoidance operation for issuing instructions for radar wave detection and frequency change (DFS) can select the next communication station that is subsequently obliged to perform the interference avoidance operation. This makes it possible to avoid an increase in the traffic required for causing a plurality of communication stations to sequentially perform the interference avoidance operation. As a result, it is possible to prevent the overall system throughput from decreasing.

Other objects, features, and advantages of the present invention will be apparent from the following detailed description of the preferred embodiments and from the accompanying drawings.

BRIEF DESCRIPTION OF THE DRAWINGS

FIG. 1 schematically shows the configuration of a wireless network according to the present invention.

FIG. 2 schematically shows the functional configuration of a wireless communication apparatus according to one embodiment of the present invention.

FIG. 8 illustrates a sequence table update that is performed to delete an entry from a sequence table shown in FIG. 7 because an existing station disappears.

FIG. 9 shows how a communication station that is currently obliged to issue instructions for radar wave detection and DFS selects one station from a neighboring station list randomly and transfers the obligation to the selected station.

FIG. 10 indicates that a change in the power supply situation of a particular communication station is reflected in the sequence table.

FIG. 11 indicates that a change in the power supply situation of a particular communication station is reflected in the sequence table.

FIG. 12 shows an example of the neighboring station list.

FIG. 13 schematically shows a typical functional configuration of a central control section that is operating in an interference avoidance operation mode.

FIG. 17 schematically shows another typical functional configuration of the central control section that is operating in the interference avoidance operation mode.

FIG. 20 is a flowchart illustrating a network operation that is performed by the central control section shown in FIG. 19.

FIG. 25 schematically shows a typical functional configuration of a mobile station.

DETAILED DESCRIPTION OF THE PREFERRED EMBODIMENTS

Figure 3:
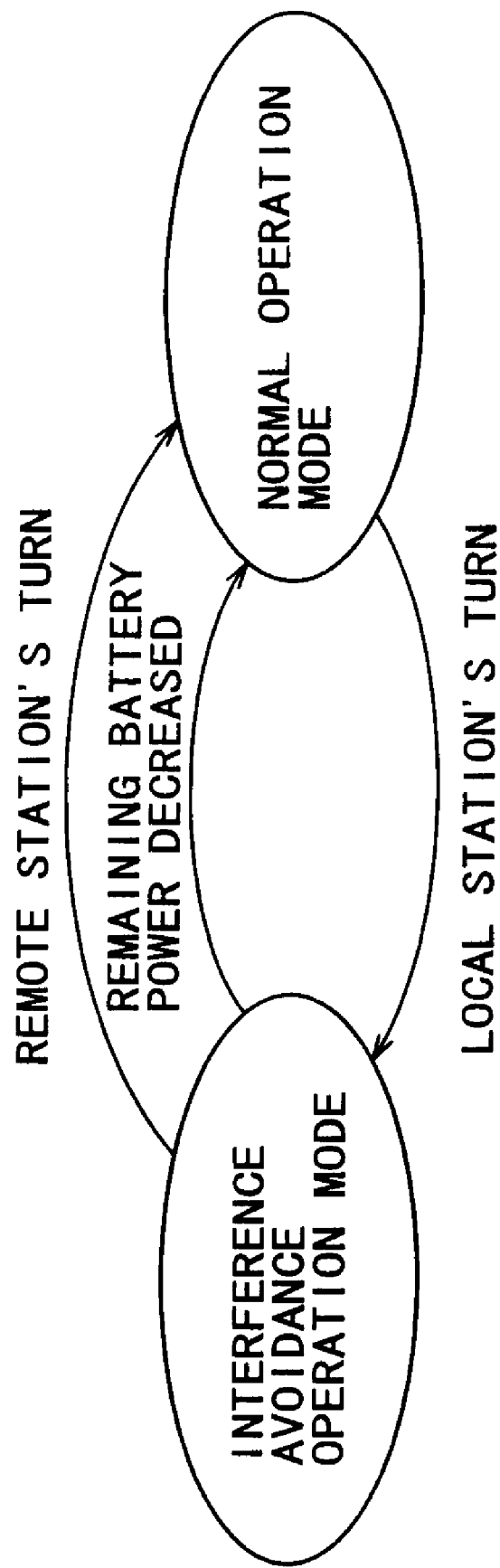
FIG. 3 shows a state transition diagram of the wireless communication apparatus.

Embodiments of the present invention will now be described with reference to the accompanying drawings.

The present invention assumes that a wireless communication path is used to establish a network among a plurality of communication stations. The present invention also assumes that store-and-forward traffic is used for communication, and that information is transferred in packets. Although the following explanation assumes that each communication station uses a single channel, the present invention can also be applied to a case where a multi-channel transmission medium is used to handle a plurality of frequency channels.

In a wireless network according to the present invention, transmission (MAC) frames having a moderate time-division multiple access structure are used to exercise transmission control while effectively using a channel resource. Each communication station can transmit information directly and asynchronously by performing an access procedure based on CSMA (Carrier Sense Multiple Access), and establish an autonomous, distributed, wireless network. The communication environment assumed by one embodiment of the present invention is based on the IEEE 802.11a standard, which is an extension of the IEEE 802.11 standard.

In a wireless communication system in which no particular control station is installed as described above, each communication station transmits beacon information to report its existence and network configuration to neighboring communication stations (within the communication range). A communication station newly entering the communication range of another communication station receives a beacon signal to detect that it is in the communication range of another communication station, and becomes aware of the network configuration by deciphering the information contained in the beacon signal.

The wireless network according to the present invention operates in a 5 GHz band (5.15 to 5.35 GHz and 5.47 to 5.825 GHz). It uses the same frequency band as for meteorological radar waves. Therefore, the system has a radar wave detection function. When a radar wave is detected, all the communication stations within the system change the employed frequency.

The communication station processes described below are basically performed by all communication stations participating in the network. In some cases, however, all the communication stations constituting the network do not always perform the processes described below.

A. System Configuration

FIG. 1 schematically shows the configuration of a wireless network according to the present invention. The network shown in the figure comprises four communication stations 1300a-1300d, which are provided with a radar wave detection mechanism. Although the network provides wireless data transmission, it does not include an access point, base station, or other device that provides centralized network control. It is an autonomous, distributed, wireless network in which all mobile stations are equal.

It should be pointed out, however, that the network may contain a general communication station, which does not incorporate a radar wave detection mechanism and changes the employed frequency in compliance with a dynamic frequency selection (DFS) instruction issued by a remote station.

In a wireless communication system without a particular control station, each communication station transmits beacon information to notify neighboring communication stations (within the communication range) of its existence and network configuration. A communication station newly entering the communication range of another communication station receives a beacon signal to detect that it is now within the communication range, and deciphers the information contained in the beacon signal to become aware of the network configuration.

Further, the communication station newly participating in the network performs a scan, listens to a beacon signal generated from neighboring stations, detects that it is now within the communication range, and becomes aware of the network configuration by deciphering the information contained in the beacon signal. While gradually synchronizing with the beacon reception timing, the communication station newly participating in the network sets the local beacon transmission timing within an interval during which no beacon signal is transmitted from the neighboring stations.

The beacon transmission procedure to be performed by each communication station will now be described with reference to FIG. 26.

While listening to a beacon signal generated from surrounding stations, each communication station gradually achieves synchronization. A new communication station entering the network sets its beacon transmission timing that does not conflict with the beacon transmission timing of any existing communication station.

If there is no surrounding communication station, communication station 01 can start transmitting a beacon signal with any appropriate timing. The beacon signal is transmitted at 40-millisecond intervals. In the uppermost example in FIG. 26, the reference numeral B01 denotes a beacon signal that is transmitted from communication station 01.

Any newly participating communication station, which enters the communication range of communication station 01, sets its beacon transmission timing that does not conflict with the existing beacon transmission timing.

Figure 26:
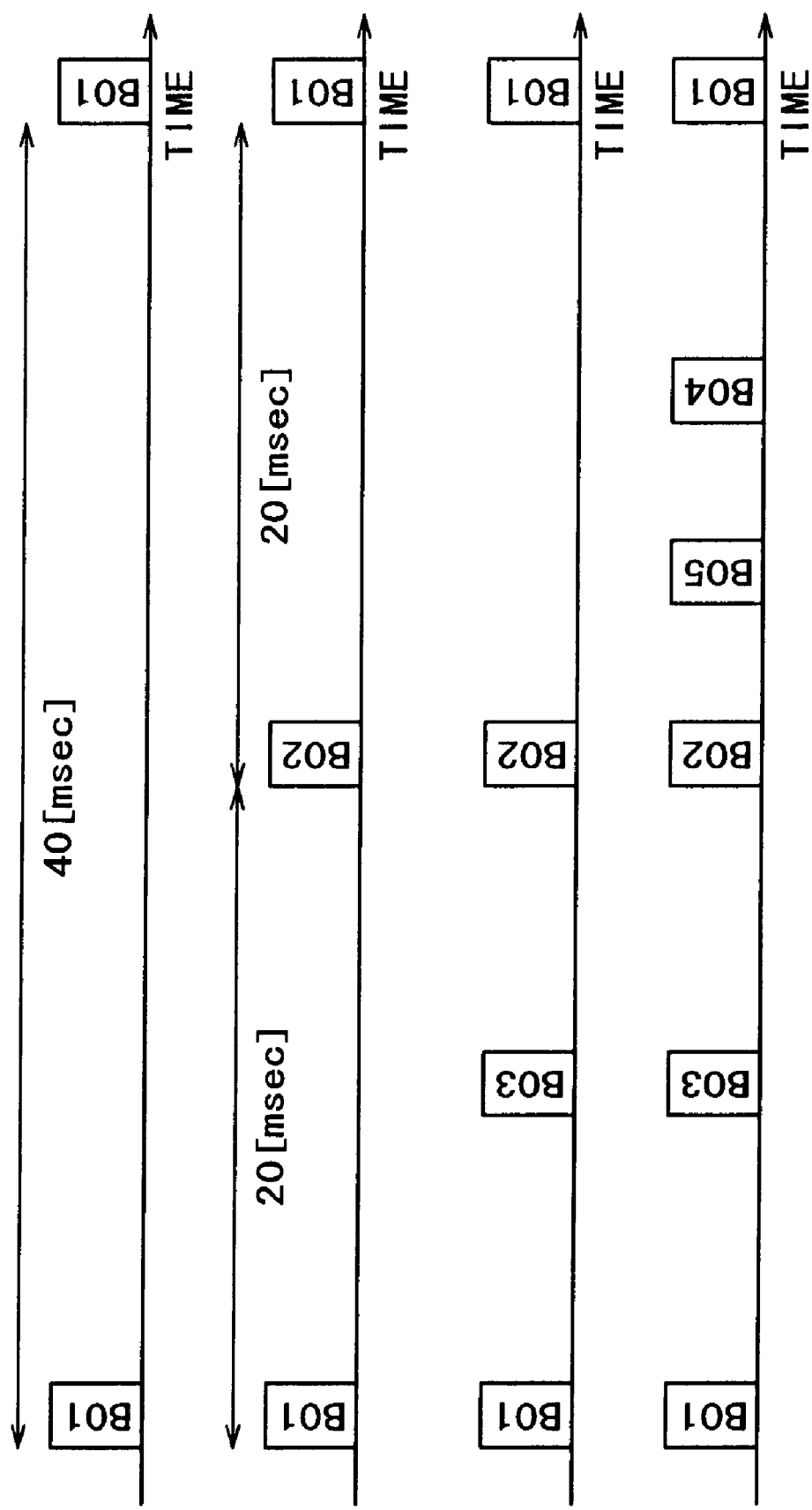
FIG. 26 illustrates a beacon transmission procedure that is performed by each communication station.

If, for instance, communication station 02 newly appears on a channel on which only communication station 01 exists, as indicated in the uppermost example in FIG. 26, communication station 02 receives a beacon signal from communication station 01 to recognize the existence of beacon position of communication station 01, sets its beacon transmission time midway within the beacon interval of communication station 01 as indicated in the second uppermost example in FIG. 26, and starts a beacon transmission sequence.

If, for instance, communication station 03 newly appears, it receives at least a beacon signal transmission from communication station 01 or 02, and recognizes the existing communication stations. As indicated in the third uppermost example in FIG. 26, communication station 03 starts a beacon transmission sequence at a time that is midway between the beacon transmissions from communication stations 01 and 02.

In accordance with the same algorithm described above, the beacon intervals become narrower each time a new communication station participates in the network. If, for instance, communication station 04 appears, it sets a beacon transmission time midway between the beacon transmissions from communication stations 01 and 02 as indicated in the lowermost example in FIG. 26. If communication station 05 appears next, it sets a beacon transmission time midway between the beacon transmissions from communication stations 02 and 04.

However, provision is made so that the band (super frame cycle) is not filled with beacon signals. More specifically, a minimum beacon interval Bmin is defined so that two or more beacon transmissions cannot be timed within an interval of Bmin. If, for instance, the minimum beacon interval Bmin is set at 625 milliseconds while the super frame cycle is 40 milliseconds, no more than 64 communication stations can be accommodated within the reach of radio waves.

When a new beacon signal is to be positioned with a super frame, each communication station acquires a preferential use region (TPP) immediately after beacon transmission (described later). For transmission efficiency enhancement, it is preferred that beacon transmissions from the communication stations be uniformly distributed within a super frame cycle of one channel instead of being timed close to each other. Therefore, the present embodiment assumes as indicated in FIG. 26 that beacon transmission basically starts midway within the longest beacon interval as far as the beacon signal is locally audible. Alternatively, however, the apparatus power consumption may be reduced by timing the beacon transmissions from the communication stations close to each other and performing no reception operation within the remaining super frame cycle.

Figure 27:
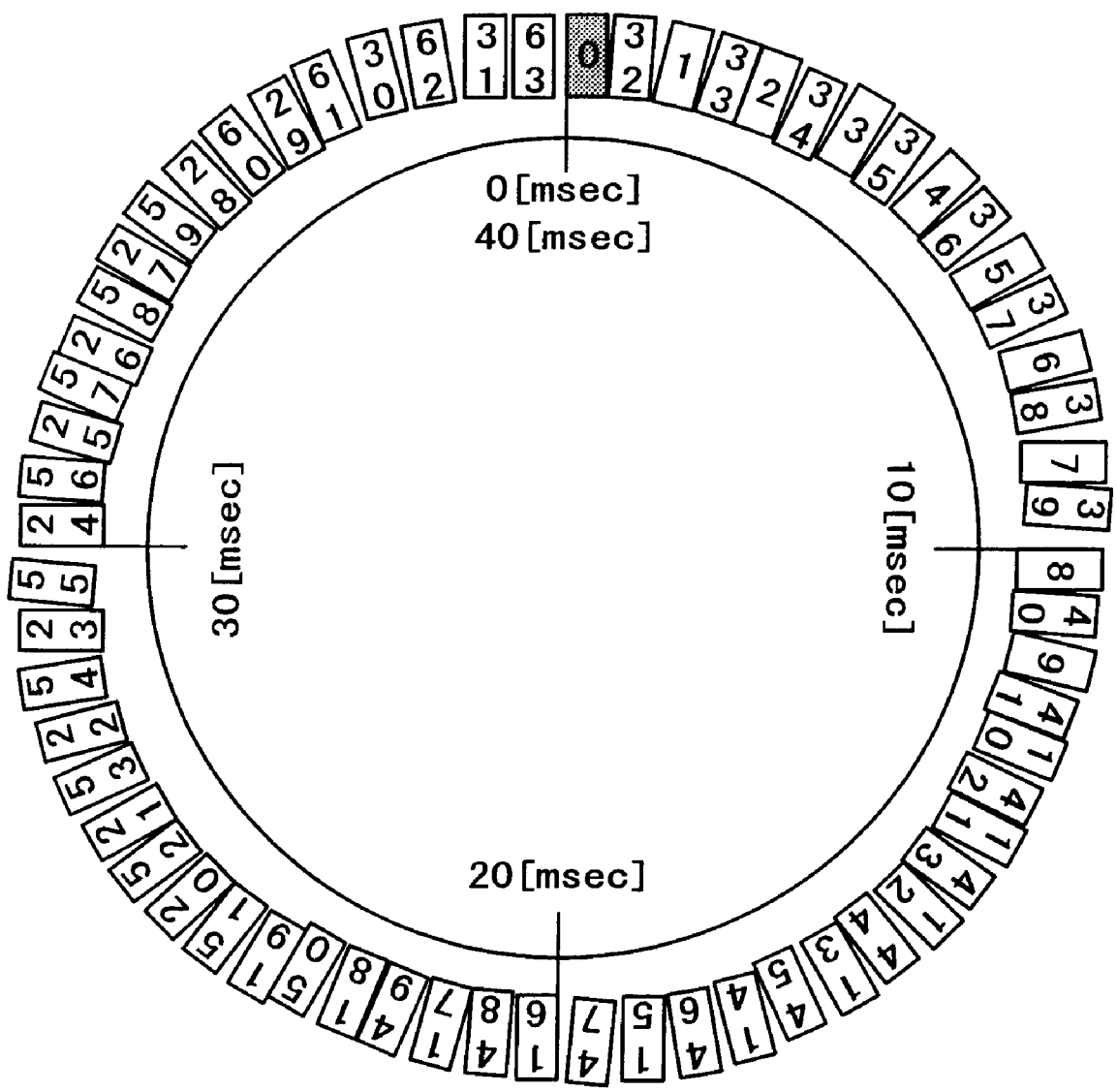
FIG. 27 schematically shows beacon transmission timing (TBTT) that can be provided within a super frame.

FIG. 27 schematically shows the beacon transmission timing (TBTT) that can be provided within a super frame. A position in which a beacon signal can be placed may be referred to as a slot. In the example shown in FIG. 27, the time elapse within a 40-millisecond super frame is indicated in terms of a clockwise rotating hand of a clock.

FIG. 2 schematically shows the functional configuration of a wireless communication apparatus 100 according to one embodiment of the present invention. For a normal wireless data transmission, the wireless communication apparatus 100 shown in the figure can operate as a communication station 1300 within the network shown in FIG. 1 while avoiding collision by gaining effective channel access to a remote communication station existing within the same wireless system.

As shown in the figure, the wireless communication apparatus 100 comprises an interface 101, a data buffer 102, a central control section 103, a transmission data generation section 104, a wireless transmission section 106, a timing control section 107, an antenna 109, a wireless reception section 110, a received data analysis section 112, an information storage section 113, a radar wave detection section 114, a power supply management section 115, and an AC power supply 116a or a battery 116b, which serves as an apparatus drive power supply.

The interface 101 exchanges various information with an external device (e.g., a personal computer (not shown)) that is connected to the wireless communication apparatus 100.

The data buffer 102 is used to temporarily store data transmitted from a device via the interface 101 and data received via a wireless transmission path before their transmission via the interface 101.

The transmission data generation section 104 generates packets and beacon signal that are to be transmitted from the local station to a surrounding station. For example, the generated packets are data packets, ready-to-send (RTS) packets from a receiving station, clear-to-send (CTS) packets for acknowledging a RTS packet, ACK packets, and frequency change request packets (in the interference avoidance operation mode (described later) only). When a data packet is to be generated, a specified length of transmission data stored in the data buffer 102 is acquired and generated as a payload.

The wireless transmission section 106 includes a modulator for modulating a transmission signal by an OFDM (Orthogonal Frequency Division Multiplexing) or other predetermined method, a digital-to-analog converter for converting a digital transmission signal to an analog signal, an upconverter for effecting frequency conversion to increase the frequency of an analog transmission signal, and a power amplifier (PA) for amplifying the power of an upconverted transmission signal (none of these components are shown), and performs a wireless transmission process on a packet signal at a predetermined transmission rate. In the present embodiment, the wireless transmission section 106 can perform a transmission operation while changing the employed frequency in accordance with the results of radar wave detection within the network.

The wireless reception section 110 comprises a low-noise amplifier (LNA) for amplifying the voltage of a signal received from a remote station via the antenna 109, a downconverter for effecting frequency conversion to decrease the frequency of a voltage-amplified received signal, an automatic gain controller (AGC), an analog-to-digital converter for converting a received analog signal to a digital signal, and a demodulator for performing a demodulation process by a demodulation method such as a synchronization process for synchronization, channel estimation, and OFDM (none of these components are shown). In the present embodiment, the wireless reception section 110 can perform a reception operation while changing the employed frequency in accordance with the results of radar wave detection within the network.

The antenna 109 wirelessly transmits a signal to a remote wireless communication apparatus on a predetermined channel or collects a signal transmitted from a remote wireless communication apparatus. It is assumed that the present embodiment has a single antenna that cannot simultaneously provide transmission and reception.

The timing control section 107 provides timing control for the purpose of transmitting/receiving a wireless signal. For example, the timing control section 107 provides transmission timing control (e.g., setting the frame interval (IFS) between the last packet reception and the packet transmission from the local station and performing back-off setup) over its own packets and packets based on the RTS/CTS method (e.g., RTS, CTS, data, and ACK packets), performs transmission standby period (NAV) setup for receiving packets addressed to a remote station, and provides timing control, for instance, for beacon transmission/reception.

The received data analysis section 112 analyzes packet signals received from a remote station (including the analyses of RTS and CTS signals), a frequency change instruction packet (in the normal operation mode (described later) only), and a beacon signal.

The information storage section 113 stores, for instance, an executable procedure instruction program for a series of access control operations performed by the central control section 103 and the information derived from received packets and beacon analysis results.

The radar wave detection section 114 keeps on checking for an incoming radar wave at almost all times during its operation (except for a period during which the local station is engaged in transmission). If the detected radar wave strength exceeds a predetermined threshold value while the wireless communication apparatus 100 according to the present embodiment operates in the interference avoidance operation mode (described later), the radar wave detection section 114 notifies the central control section 103 of such an event. While the wireless communication apparatus 100 is running in the normal operation mode (described later), the radar wave detection section 114 may stop running because it is not necessary to achieve radar wave detection or instruct each station to change the employed carrier frequency in accordance with a radar wave detection.

The wireless communication apparatus 100 can use either the AC power supply 116a or battery 116b as its drive power supply. If, for instance, the wireless communication apparatus 100 operates as an installed station, it should use the AC power supply 116a to receive a steady power supply for the sake of convenience. If the wireless communication apparatus 100 operates as a mobile station, it should use the battery 116b because terminal operations can be performed without being restrained by a power cable.

The power supply management section 115 monitors the power supply that is used to drive the wireless communication apparatus 100, and reports the monitoring results to the central control section 103. The report generated by the power supply management section 115 indicates whether the AC power supply 116a or battery 116b is currently used as the main power supply. If the battery 116b is used for driving the wireless communication apparatus 100, the report also indicates the remaining power of the battery 116b or states that the remaining power of the battery 116b is low.

The central control section 103 provides integrated control over the wireless data transmission operations to be performed by the wireless communication apparatus 100 (namely, manages a series of information transmission/reception processes and exercises transmission path access control), and provides overall control over the other apparatus operations.

For wireless data transmission, access control is basically exercised by following a CSMA procedure. More specifically, a back-off timer is operated for a randomly selected period of time while monitoring the transmission path condition. If no transmission signal is encountered during such a period of time, a transmission right is acquired.

As regard apparatus operations, the wireless communication apparatus 100 according to the present embodiment defines two operation modes: interference avoidance operation mode and normal operation mode. In the interference avoidance operation mode, the wireless communication apparatus 100 instructs each station to detect a radar wave and change the employed carrier frequency in accordance with a radar wave detection. In the normal operation mode, the wireless communication apparatus 100 performs a communication operation while changing the employed carrier frequency in compliance with a remote station's instruction for a change in the employed carrier frequency.

To permit coexistence with a radar wave, it is necessary that at least one communication station run in the interference avoidance operation mode within a network. For communication stations operating within the same communication range, a predetermined procedure is performed to determine the order in which an interference avoidance operation is performed. The determined order is written in a sequence table. The sequence table is stored in the information storage section 113. The central control section 103 references the sequence table. When the sequence table indicates that the local station should perform an interference avoidance operation, the central control section 103 switches from the normal operation mode to the interference avoidance operation mode. When the local station is no longer obliged to perform an interference avoidance operation, the central control section 103 switches from the interference avoidance operation mode to the normal operation mode. FIG. 3 shows a state transition diagram of the wireless communication apparatus 100.

When the radar wave detection section 114 notifies the central control section 103 that a predetermined threshold value is exceeded by the detected radar wave strength in the interference avoidance operation mode, the central control section 103 creates command data for instructing each communication station within the communication range to change the frequency. The command data is modulated by the wireless transmission section 106 and transmitted as a wireless signal via the antenna 109.

In the interference avoidance operation mode, the load imposed on the power supply increases because additional processing operations, which are not required in the normal operation mode, need to be performed, for instance, to issue instructions for radar wave detection and frequency change. In accordance with the power supply situation reported from the power supply management section 115, the central control section 103 may therefore set the time during which the local station performs an interference avoidance operation. If, for instance, the AC power supply 116 is used as a power supply, the local station may operate in the interference avoidance operation mode for an indefinite period of time. If, on the other hand, the employed power supply is the battery 116b, which has a limited power supply capacity, the local station operates in the interference avoidance operation mode for a relatively short period of time only. Further, if the remaining power of the battery 116b is low, the local station may revert to the normal operation mode by transferring the obligation to perform an interference avoidance operation to a remote station.

The radar wave detection section 114 consumes the power during its operation because it keeps on checking for a radar wave at almost all times (except for a period during which the local station is engaged in transmission). In the normal operation mode, however, the radar wave detection section 114 does not have to achieve radar wave detection. For power consumption minimization purposes, therefore, the central control section 103 may stop a radar wave detection operation by issuing an operation stop instruction to the radar wave detection section 114 when it switches to the normal operation mode. If the central control section 103 switches back to the interference avoidance operation mode, it issues an operation restart instruction to the radar wave detection section 114.

In the example shown in FIG. 2, the radar wave detection section 114 receives a wireless signal input in parallel with the wireless reception section 110. However, an alternative configuration may be employed so that the wireless reception section 110 and radar wave detection section 114 share a part of the reception system.

In the example shown in FIG. 2, the radar wave detection section 114, wireless transmission section 106, and wireless reception section 110 are connected to the same antenna. However, the present invention is not limited to such a configuration.

For example, the radar wave detection section 114 may be connected to a dedicated antenna instead of the wireless data transmission/reception antenna 109. Another alternative is to connect two antennas to the wireless transmission section 106 and wireless reception section 110 to provide antenna selection diversity, thereby offering a choice between the two antennas, and connect either of the two antennas to the radar wave detection section 114.

B. Radar Wave Detection and DFS Instruction Operations for Interference Avoidance The operation performed by a mobile station having a radar wave detection mechanism will now be described with reference to FIG. 1.

If, for instance, a mobile station 1300a having a radar wave detection mechanism is obliged to issue instructions for radar wave detection and DFS, it switches to the interference avoidance operation mode, turns on the radar wave detection section 114 within the local station, and keeps on checking for an incoming radar wave.

If the radar wave detection section 114 detects a radar wave whose strength is greater than a predetermined threshold value, it notifies the central control section 103 of such an event. Upon receipt of such a notification, the central control section 103 creates frequency change command data, including changed frequency channel number data, for remote communication stations 1300b-1300d having a radar wave detection mechanism and communication stations having no radar wave detection mechanism (not shown) within the wireless network, causes the wireless reception section 110 to modulate the command data, and transmits the modulated command data as a wireless signal from the antenna 109.

Communication stations 1300b-1300d, which have a radar wave detection mechanism and are not obliged to issue instructions for radar wave detection and DFS, receive the wireless signal with the antenna 109, cause the wireless reception section 110 to demodulate the received signal, and conveys the received command data to the central control section 103. The central control section 103 creates response data for acknowledging the command data, causes the wireless transmission section 106 to modulate the command data, and transmits the command data as a wireless signal from the antenna 109. The other communication stations (not shown) having no radar wave detection mechanism also create response data for the command data transmitted from communication station 1300a, and return the response data to communication station 1300a.

Communication station 1300a, which has a radar wave detection mechanism and is obliged to issue instructions for radar wave detection and DFS, receives the transmitted wireless signal with the antenna 109, causes the wireless reception section 110 to demodulate the received signal, and conveys the acknowledgment data, which is received from communication stations 1300b-1300d having a radar wave detection mechanism, to the central control section 103.

When the acknowledgments are received from communication stations 1300b-1300d within the network, the central control section 103 of communication station 1300a, which has a radar wave detection mechanism and is obliged to issue instructions for radar wave detection and DFS, changes the settings for the wireless transmission section 106 and wireless reception section 110 so as to transmit/receive a frequency corresponding to the previously reported frequency channel number, and starts a transmission/reception operation on a new frequency channel.

Whether the frequency channel is changed can be determined by checking whether beacons are interchanged. In other words, when the wireless reception section 110 of communication stations 1300b-1300d having a radar wave detection mechanism detects that no more periodic beacon is received from communication station 1300a, which has a radar wave detection mechanism and is obliged to issue instructions for radar wave detection and DFS, it notifies the central control section 103 of such an event. Upon receipt of such a notification, the central control section 103 changes the settings for the wireless transmission section 106 and wireless reception section 110 so as to transmit/receive a frequency corresponding to the previously reported, changed frequency channel data, and starts a reception operation on a new frequency channel.

While the above procedures are performed, communication stations 1300b-1300d, which have a radar wave detection mechanism and are not obliged to issue instructions for radar wave detection and DFS, turn off the radar wave detection section 114 to reduce the power consumption.

C. Procedures for Transferring the Obligation to Perform an Interference Avoidance Operation To permit coexistence with a radar wave in an autonomous distributed wireless network according to the present embodiment, it is necessary that at least one communication station operate in the interference avoidance operation mode within the network.

If only a particular communication station constantly runs in the interference avoidance operation mode and remains obliged to issue instructions for radar wave detection and frequency change (DFS), the processing load and power supply load concentrate on such a communication station. If the communication station is battery powered, the battery consumes rapidly, thereby remarkably reducing its operating time. If the remaining battery power is low and the apparatus operation comes to a stop, no communication station within the network is obliged to perform an interference avoidance operation. Consequently, it is impossible to provide coexistence with a radar wave so that a network failure occurs.

For the operation of a wireless network according to the present embodiment, therefore, it is essential that a plurality of communication stations sequentially become obliged to issue instructions for radar wave detection and DFS. The procedures for transferring such an obligation will now be described in detail.

C-1. Transferring the Obligation by a Nonprocedural Method

Figure 4:
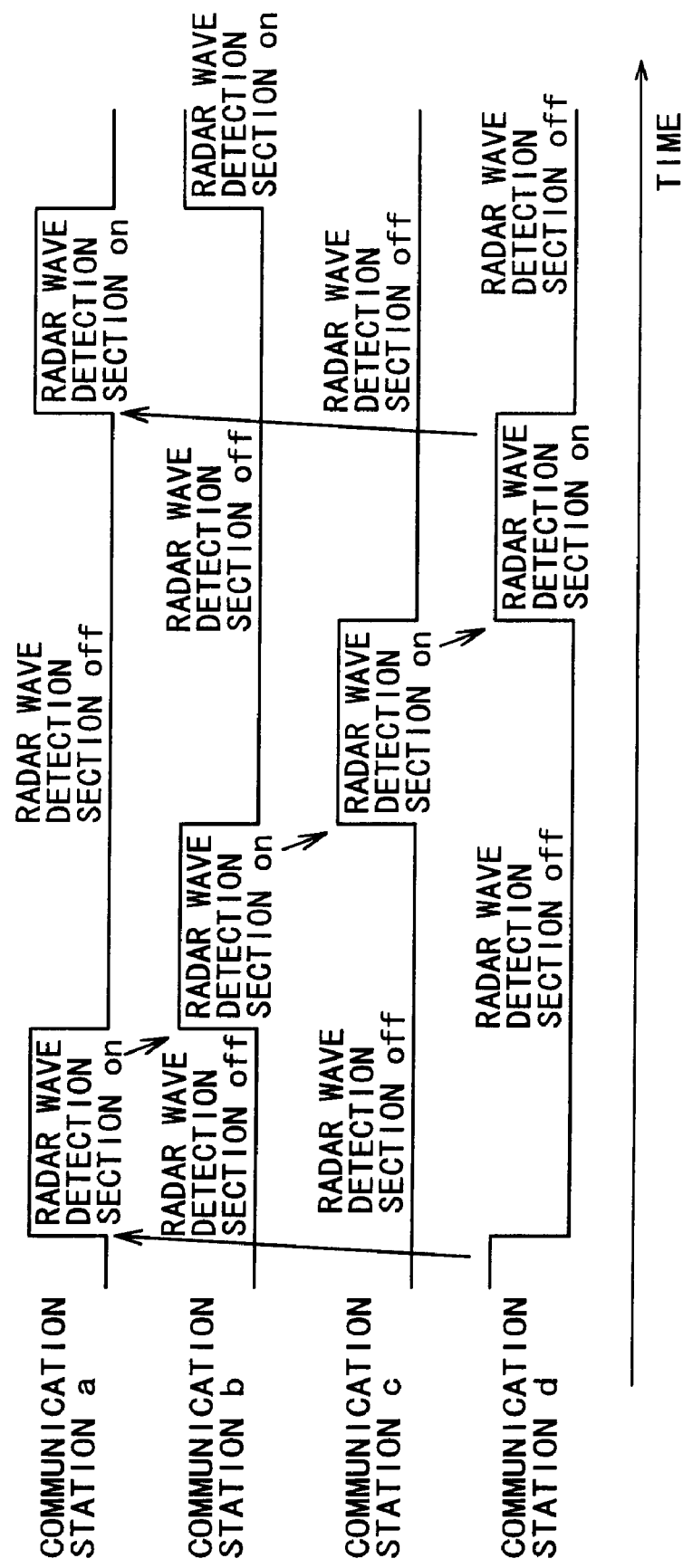
FIG. 4 shows a typical procedure for sequentially transferring the obligation to issue instructions for radar wave detection and DFS from one communication station having a radar wave detection mechanism to another.

FIG. 4 shows a typical procedure for sequentially transferring the obligation to issue instructions for radar wave detection and DFS from one communication station having a radar wave detection mechanism to another (communication stations 1300a-1300d).

As indicated in the example shown in FIG. 4, the radar wave detection section 114 in at least one communication station having a radar wave detection mechanism is on at a time whereas the radar wave detection section 114 in the other communication stations having a radar wave detection mechanism is off.

It is theoretically possible to transfer the obligation to issue instructions for radar wave detection and DFS at predetermined time intervals as described above. For network operations, however, both the communication stations involved should confirm that the obligation is transferred from one communication station to another.

Figure 5:
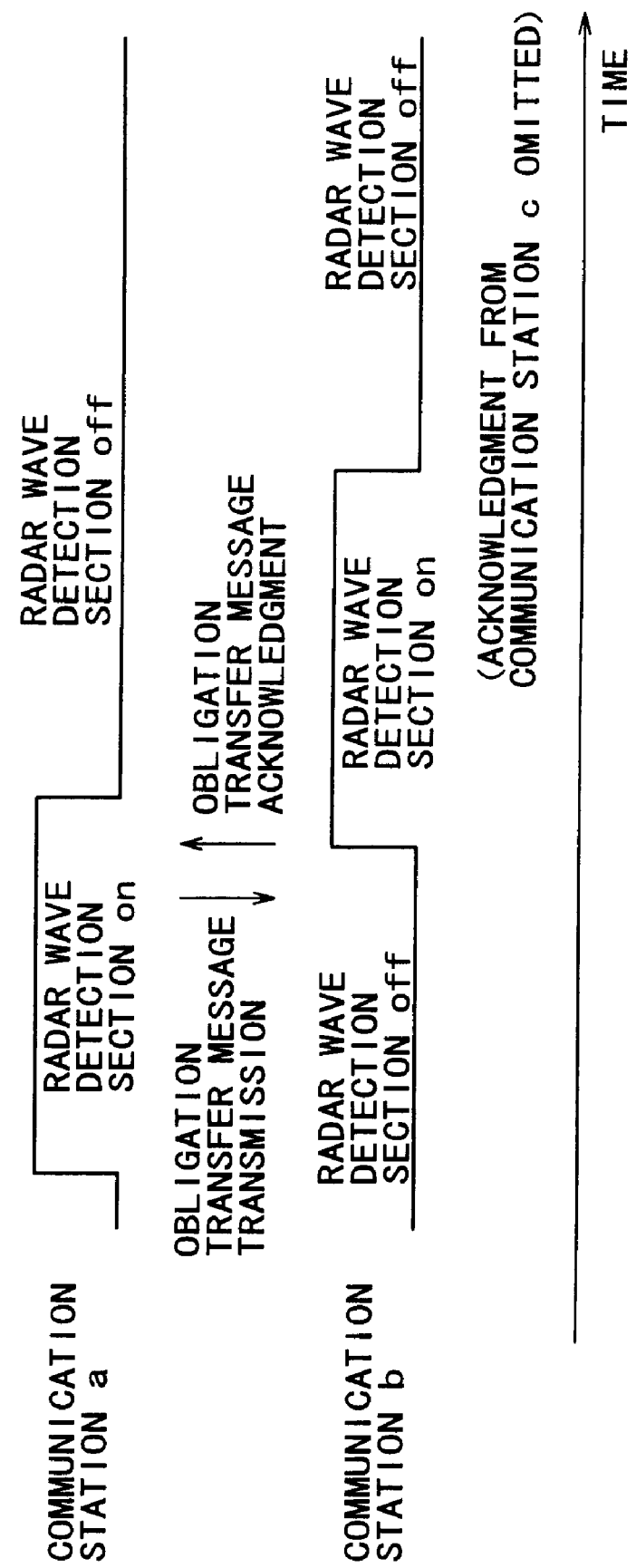
FIG. 5 shows a typical operation that is performed to transfer the obligation after a predetermined procedure is completed by communication stations.

C-2. Transferring the Obligation after a Procedure is Completed by Communication Stations FIG. 5 shows a typical operation that is performed to transfer the obligation after a predetermined procedure is completed by communication stations. In the example shown in FIG. 5, communication station 1300a, which has a radar wave detection mechanism, transfers the obligation to issue instructions for radar wave detection and DFS to communication station 1300b, which also has a radar wave detection mechanism.

First of all, communication station 1300a, which has a radar wave detection mechanism, is obliged to issue instructions for radar wave detection and DFS. When a period during which communication station 1300a is obliged to issue instructions for radar wave detection and DFS is about to terminate, communication station 1300a wirelessly notifies communication station 1300b, which also has a radar wave detection mechanism, that communication station 1300a wishes to transfer the obligation to communication station 1300b.

Upon receipt of such a notification, communication station 1300b wirelessly sends an acknowledgment to communication station 1300a. Upon receipt of the acknowledgment, communication station 1300a turns off its radar wave detection section and communication station 1300b turns on its radar wave detection section.

Figure 6:
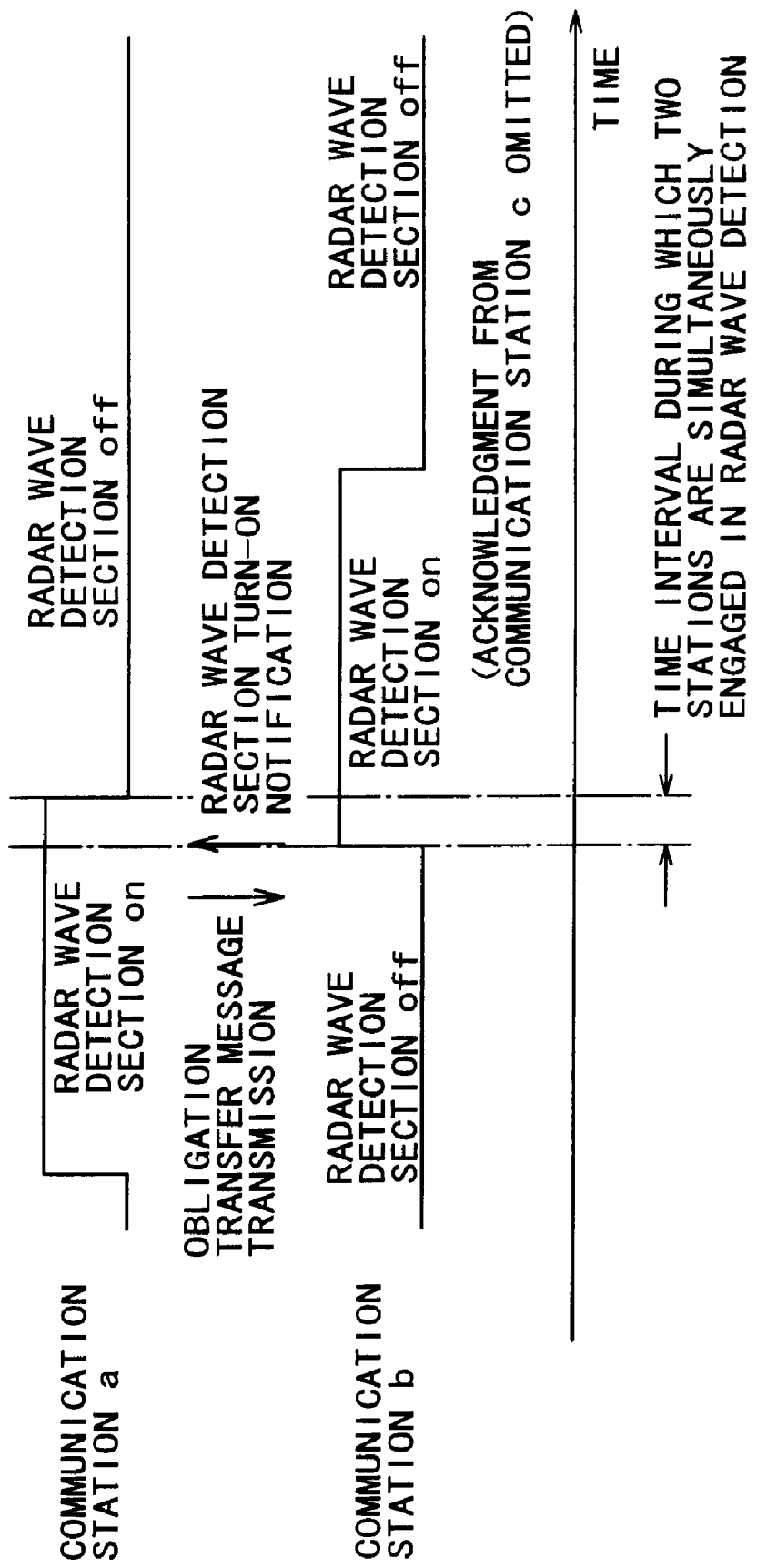
FIG. 6 shows a typical operation in which communication stations perform predetermined procedures for transferring the obligation from a first communication station to a second communication station and causing the first communication station to confirm the beginning of a radar wave detection operation of the second communication station.

C-3. Transferring the Obligation after a Procedure is Completed by Communication Stations to Confirm the Beginning of a Remote Station's Radar Wave Detection Operation FIG. 6 shows a typical operation in which communication stations perform predetermined procedures for transferring the obligation from a first communication station to a second communication station and causing the first communication station to confirm the beginning of a radar wave detection operation of the second communication station. The figure illustrates the procedure that communication station 1300a, which has a radar wave detection mechanism, performs to transfer the obligation to issue instructions for radar wave detection and DFS to communication station 1300b, which has a radar wave detection mechanism.

First of all, communication station 1300a, which has a radar wave detection mechanism, is obliged to issue instructions for radar wave detection and DFS. When a period during which communication station 1300a is obliged to issue instructions for radar wave detection and DFS is about to terminate, communication station 1300a wirelessly notifies communication station 1300b, which also has a radar wave detection mechanism and should become obliged to issue instructions for radar wave detection and DFS, that communication station 1300a wishes to transfer the obligation to communication station 1300b.

Upon receipt of such a notification, communication station 1300b turns on its radar wave detection section and wirelessly notifies communication station 1300a that the radar wave detection section is turned on. Upon receipt of such a notification, communication station 1300a turns off its radar wave detection section.

In the example shown in FIG. 5, the relationship between the time at which communication station 1300a turns off its radar wave detection section 114 and the time at which communication station 1300b turns on its radar wave detection section 114 cannot be assured. More specifically, it is possible that no communication station within the network has turned on its radar wave detection section. In the example shown in FIG. 6, however, the period during which no radar wave detection section is on is perfectly eliminated. Therefore, the example shown in FIG. 6 assures that the radar wave detection section of at least one communication station is on.

In the examples shown in FIGS. 5 and 6, communication stations 1300a and 1300b, which both have a radar wave detection mechanism, do not always have to establish direct communication. In a situation, for instance, where an electric wave does not directly reach its destination, a multi-hop transmission method may be used so that the signal is relayed by another communication station within the same network.

In the examples shown in FIGS. 4 through 6, the objective is to turn on the radar wave detection section 114 in at least one communication station 1300 having a radar wave detection mechanism. In the example shown in FIG. 6, the radar wave detection sections 114 of the two communication stations operate only for a moment. On the other hand, if, for instance, an ad-hoc wireless communication system is used to offer a large coverage area, an alternative configuration may be employed so that the radar wave detection sections 114 of a plurality of communication stations having a radar wave detection mechanism simultaneously turn on.

D. Method for Determining the Order in which the Obligation to Perform an Interference Avoidance Operation is to be Transferred As described earlier, the operation performed to transfer the obligation to issue instructions for radar wave detection and DFS from one communication station to another is essential to network operation. All the communication stations are sequentially obliged to perform an interference avoidance operation in a time sharing manner. Communication stations that successively become obliged perform an operation described in section C above to transfer the obligation.

This section describes the order in which the communication stations become obliged to issue instructions for radar wave detection and DFS or the method for determining what communication station should become obliged to issue instructions for radar wave detection and DFS.

D-1. Method for Referencing the Table

The order in which the communication stations within the network become obliged to perform an interference avoidance operation can be managed, for instance, with the sequence table that describes the sequence in which the obligation should be transferred (described earlier). It is probable that the sequence table may become updated when a certain communication station participates in the network or it is found that a certain communication station has left the network.

A communication station that turns on first operates in the interference avoidance operation mode and becomes obliged to issue instructions for radar wave detection and DFS until another station participates in the network.

When a second communication station participates in the network, the first communication detects the entry of the second communication station, updates the sequence table, and reports such an update to the second communication station.

When a third communication station participates in the network and the first communication station can directly communicate with the third communication station, the first communication station updates the sequence table and reports such an update to the second and third communication stations.

If the first communication station cannot directly communicate with the third communication station and the second communication station can directly communicate with the third communication station, the second communication station notifies the first communication station that the third communication station has participated in the network. Upon receipt of such a notification, the first communication station updates the locally managed sequence table and reports such an update to the second and third communication stations.

As a modified version of the above sequence table update method, it is conceivable that the second communication station may update the sequence table and report such a sequence table update to the first and third communication stations. However, if an increased number of communication stations participate in the network and a plurality of communication stations simultaneously notice a new entry in the network and individually update the sequence table, it is possible that a sequence table inconsistency may result. It is therefore preferred that the sequence table be managed only by the first communication station or other predetermined communication station.

In the present embodiment, the sequence table is exclusively managed by a communication station running in the interference avoidance operation mode within the network, that is, by a communication station that is currently obliged to issue instructions for radar wave detection and DFS.

Figure 7:
FIG. 7 illustrates a sequence table update that is performed to additionally register a new participating station.

FIG. 7 shows an example of a sequence table update, which has been described above. In the illustrated example, the sequence table contains entries, which respectively represent the communication stations that have participated in the network. The information provided for each entry indicates the order in which the communication stations should become obliged to perform an interference avoidance operation, that is, issue instructions for radar wave detection and DFS, the identification information (mobile station ID) about the associated communication station, and the power supply employed for the associated communication station.

An IP address or the like may be used as a mobile station ID. However, the device's serial number may also be used as a mobile station ID. As the power supply situation information, the use of either AC power or battery power is indicated. When a battery is used as a power supply, supplementary information may be added to indicate the remaining battery power or the remaining battery operation time.

If communication stations having no radar wave detection mechanism (incapable of becoming obliged to issue instructions for radar wave detection and DFS) are allowed to participate in the network, they may also enter the sequence table. In such an instance, however, the information about each entry should indicate whether the associated communication station has a radar wave detection mechanism (not shown). The communication stations having no radar wave detection mechanism are excluded from the order of obligation transfer so that the value in the associated obligation transfer order field is invalid.

The example shown in FIG. 7 assumes that an AC-powered, sixth communication station newly participates in the network comprising five communication stations. The communication station managing the sequence table, that is, the communication station that is currently fulfilling the obligation, detects the participation of the sixth communication station or receives a report indicating the participation of the sixth communication station from another communication station, additionally registers a sixth communication station entry to update the sequence table, and reports such a sequence table update to the other communication stations.

FIG. 8 shows an example of a sequence table update that is performed to delete an entry from the sequence table shown in FIG. 7 because one existing station disappears. The example assumes that a communication station registered as the third entry in the sequence table leaves the network comprising five communication stations.

If, for instance, the third communication station turns off or moves to a location outside the electric wave range of the first and second communication stations or the disassociation message is received from the third communication station, it is found that the third communication station has left the network because no transmission is received from the third communication station for a predetermined period of time.

The communication station managing the sequence table, that is, the communication station that is currently fulfilling the obligation, detects the disassociation of the third communication station from the network or receives a report indicating the disassociation of the third communication station from another communication station, deletes the third communication station entry to update the sequence table, and reports such a sequence table update to the other communication stations.

When the sequence table is to be updated as indicated in FIG. 7 or 8, the entries within the table may be arranged in the order of network participation, in the order of ID numbers or addresses of the associate devices, or in random order.

D-2. Sequential Selection Method

When the order in which the communication stations become obliged to issue instructions for radar wave detection and DFS is to be determined in accordance with the sequence table described above, a problem arises with the table management processing load on a plurality of communication stations within an autonomous distributed network. If an increased number of communication stations participate in an ad-hoc wireless communication system while the above deterministic approach is employed, the frequency of table update may increase to incur an increase in the traffic, thereby limiting the user data transmission capacity, which is essentially important.

The inventors of the present invention think that, in an autonomous distributed wireless network, the currently obliged communication station should determine, in an arbitrary manner, that is, in an autonomous distributed manner, the next communication station to which the obligation is to be transferred. For example, it is preferred that the next communication station to which the obligation is to be transferred be selected in an autonomous distributed manner. More specifically, the target station should be determined by selecting one station (a station having a radar wave detection mechanism) from the locally possessed neighboring station list in compliance with a random selection standard that provides virtually equal selection probability.

If, for instance, two independently operating networks join together during the use of the above determination method, the networks can be integrated into a single whole the moment the obligation is transferred to a communication station that is currently engaged in radar wave detection from either of the networks, which previously operated independently of each other.

The neighboring station list to choose from may comprise neighboring stations that can directly communicate with the local station or comprise such neighboring stations and hidden terminal devices or quasi-neighboring stations that are directly viewable from the former neighboring stations but out of direct communication range of the local station. When the above neighboring station list is used, it is expected in the long run that all the communication stations within an autonomous distributed wireless communication system will fulfill the obligation to issue instructions for radar wave detection and DFS virtually the same number of times.

FIG. 9 shows how a communication station that is currently obliged to issue instructions for radar wave detection and DFS selects one station from the neighboring station list randomly and transfers the obligation to the selected station.

In the example shown in the figure, the neighboring station list provides an entry for every communication station that has participated in the network. Each entry contains the identification information (mobile station ID) and power supply situation information about a communication station.

The power supply situation information may be provided to indicate not only the type of the employed power supply (AC power or battery power) but also the remaining power or remaining operating time of the employed battery.

If communication stations having no radar wave detection mechanism (incapable of becoming obliged to issue instructions for radar wave detection and DFS) are allowed to participate in the network, the communication stations should write information in the neighboring station list entries to indicate whether a radar wave detection mechanism is incorporated (not shown). The communication stations having no radar wave detection mechanism are excluded from neighboring station candidates when the next obliged communication station is to be selected from the neighboring station list.

In the example shown in FIG. 9, communication station a receives an obligation transfer message in advance from another communication station, turns on the local radar wave detection section 114 in response to the received message to switch to the interference avoidance operation mode, and becomes obliged to issue instructions for radar wave detection and DFS.

If communication station a needs to revert to the normal operation mode due to reduced remaining battery power or other factor, it selects communication station b from the locally managed neighboring station list in compliance with a random selection standard that provides virtually equal selection probability.

Communication station a then sends an obligation transfer message to communication station b. Upon receipt of the message, communication station b turns on its local radar wave detection section 114 to switch to the interference avoidance operation mode, and takes over the obligation to issue instructions for radar wave detection and DFS.

If communication station b needs to revert to the normal operation mode due to reduced remaining battery power or other factor, it selects communication station d from the locally managed neighboring station list in compliance with a random selection standard that provides virtually equal selection probability.

Communication station b then sends an obligation transfer message to communication station d. Upon receipt of the message, communication station d turns on its local radar wave detection section 114 to switch to the interference avoidance operation mode, and takes over the obligation to issue instructions for radar wave detection and DFS.

D-3. Weight for Executing the Duty

In the interference avoidance operation mode, it is necessary to issue instructions for radar wave detection and DFS and perform other additional processing operations that are not conducted in the normal operation mode. In other words, an increased power supply load is imposed on a communication station that is obliged to issue instructions for radar wave detection and DFS. When the next obliged communication station is to be determined by selecting a neighboring station listing randomly and with a predetermined probability, it is preferred that weighting be provided in accordance with the power supply situation. It is also preferred that the length of time during which a communication station is obliged to issue instructions for radar wave detection and DFS be weighted in accordance with the communication station's power supply situation.

For example, AC-powered communication stations may be weighted greatly and allowed to operate for an indefinite period in the interference avoidance operation mode. On the other hand, communication stations powered by a battery having a limited capacity should be slightly weighted and operated for a relatively short period of time in the interference avoidance operation mode.

The method for weighting the length of time during which a communication station obliged to issue instructions for radar wave detection and DFS fulfills its duty in accordance with its local power supply situation will now be described.

(1) Using a Table Reference Method for Determining the Order in which Communication Stations Become Obliged When participating in the network, a communication station reports its local power supply situation to indicate whether it is battery powered or AC powered. Further, when the sequence table, which indicates the obligation transfer order, is to be created, data is written so as to indicate not only the mobile station ID of each communication station entry but also the power supply situation (AC powered or battery powered) of each communication station entry (see FIG. 7).

The length of time during which a communication station is obliged is then weighted accordingly. For example, weighting may be provided so that an AC-powered communication station runs in the interference avoidance operation mode for a period of 2 hours after it takes over the obligation, and that a battery-powered communication station remains obliged for a period of 10 minutes only. Alternatively, any existing AC-powered communication station may become obliged to issue instructions for radar wave detection and DFS at all times. When a particular communication station leaves the network, it reports such an event to surrounding communication stations so that the associated entry is deleted from the sequence table (see FIG. 8).

Further, when the power supply situation of a certain communication station is changed, the communication station reports such a power supply situation change to the surrounding communication stations so that the associated entry is deleted from the sequence table. FIG. 10 indicates that a change in the power supply situation of a particular communication station is reflected in the sequence table. In the example shown in FIG. 10, the fourth communication station, which has been AC powered, is now battery powered; therefore, the contents of the associated sequence table entry are changed accordingly.

A typical method for attaching data to an entry to indicate whether a communication station is AC powered or battery powered has been described above. More specifically, the data indicating the remaining battery power or the length of time during which a communication station remains obliged, which is calculated from the remaining battery power, may be written in the sequence table. For example, the data contained in the sequence table may indicate that an AC-powered communication station should remain obliged for 10 hours and that a battery-powered communication station should remain obliged for 10 minutes.

In an extreme case, however, a special length of time (e.g., the maximum bit field value) may be designated so that an AC-powered communication station remains obliged to issue instructions for radar wave detection and DFS at all times.

Even if the employed power supply is changed from an AC power supply to a battery power supply or vice versa or if, for instance, the remaining battery power is significantly changed in a situation where the above scheme is employed, it is necessary that the affected communication station report such a change in the power supply situation to the surrounding communication stations for a sequence table update.

FIG. 11 indicates that a change in the power supply situation of a communication station is reflected in the sequence table. The left-hand example in FIG. 11 indicates that a communication station marked "2" (second) in the obligation transfer order field is being battery powered. The right-hand example in FIG. 11 indicates that the remaining battery power is reduced by an apparatus operation and that the length of time during which the associated communication station can remain obliged to issue instructions for radar wave detection and DFS is decreased from 10 minutes to 5 minutes. Such a power supply situation change is reflected in the associated sequence table entry.

The length of time for fulfilling the obligation may be written in the sequence table only when the obligation is transferred among communication stations by a nonprocedural method (described earlier; see FIG. 4). If, for instance, an acknowledgment procedure is performed for obligation takeover among communication stations as indicated in FIGS. 5 and 6, it is not necessary to predefine the length of time during which the individual communication stations should fulfill the obligation.

As described earlier, an AC-powered communication station may be constantly allowed to issue instructions for radar wave detection and DFS. Even when the sequence table indicates the employed power supply or the length of time for fulfilling the obligation, it is conceivable that a plurality of AC-powered communication stations may exist. In such an instance, the plurality of AC-powered communication stations may simultaneously issue instructions for radar wave detection and DFS. Alternatively, the plurality of AC-powered communication stations may negotiate with each other so that only one communication station fulfills the obligation.

(2) Using a Sequential Selection Method for Determining the Order in which Communication Stations Become Obliged No matter which of the following methods is used, it takes some time to select a particular communication station. However, an AC-powered communication station issues instructions for radar wave detection and DFS for most of the time. If such an AC-powered communication station does not exist, existing communication stations sequentially fulfill the obligation for a virtually equal length of time in the long run.

(2-1) Allowing an Obliged Communication Station to Determine the Length of Time for Fulfilling the Obligation When the employed method is such that a communication station currently obliged to issue instructions for radar wave detection and DFS communicates with the next communication station that takes over the obligation, it is not always necessary to predetermine the length of time for fulfilling the obligation. More specifically, the currently obliged communication station can determine the length of time for fulfilling the obligation in accordance with the prevailing power supply situation (as described earlier; see FIGS. 5 and 6).

If, as indicated in the example shown in FIG. 9, communication station a is battery powered and its remaining battery power is not so high, it remains obliged for a short period of approximately 5 minutes and then randomly selects the next station to which the obligation should be transferred (without considering the power supply situation of the next station). The example shown in FIG. 9 indicates that communication station b is selected as the next station. Therefore, the procedure for transferring the obligation to communication station b is performed.

If communication station b is AC powered, it is known that communication station b does not have to consider the power consumption. Therefore, communication station b fulfills the obligation for a long period, for instance, of approximately 2 hours. After the lapse of a locally set period of time for fulfilling the obligation, communication station b randomly selects the next station to which the obligation should be transferred (without considering the power supply situation of the next station). The example shown in FIG. 9 indicates that communication station d is selected as the next station. Therefore, the procedure for transferring the obligation to communication station d is performed. Subsequently, the transfer of the obligation is made in the same manner as described above.

(2-2) Determining the Obligation Transfer Destination by Referencing the Power Supply Situation of Each Remote Station When the sequential selection method is used to determine the next communication station that becomes obliged to issue instructions for radar wave detection and DFS, one station is selected from the neighboring station list in compliance with a random selection standard that provides virtually equal selection probability (as described earlier). In this instance, however, the probability may be weighted in accordance with the power supply situation of each communication station instead of using the equal selection probability. It is assumed, however, that the power supply situation data concerning the surrounding communication stations is obtained in advance.

For example, weighting may be provided so that the selection probability of AC-powered communication stations is 20 times higher than that of battery-powered communication stations. It is assumed herein that the neighboring station list possessed by communication station a looks like FIG. 12. The settings entered in the illustrated neighboring station list indicates that the probability of selecting surrounding communication station b, c, or g is $1/23$, and that the probability of selecting surrounding communication station e is $20/23$. Therefore, it is highly likely that communication station e, which is AC powered and capable of operating irrespective of power consumption, will be selected as the next obligation transfer destination.

(2-3) Using a Combination of the Above Two Methods

It goes without saying that a combination of the above two methods may be used. More specifically, the communication station to which the obligation is to be transferred may be selected with a probability that is weighted in accordance with the power supply situations of the surrounding communication stations. When the local station is selected as the communication station to which the obligation is to be transferred, it may set the length of time for fulfilling the obligation while considering its power supply situation.

Further, when the aforementioned method for sequentially selecting the communication station to which the obligation is to be transferred is employed, the target communication station may be selected from the other communication stations in the neighboring station list plus the local station.

E. Wireless Communication Apparatus Operation in the Interference Avoidance Operation Mode As described earlier, in a wireless network according to the present embodiment, the communication station obliged to issue instructions for radar wave detection and DFS is sequentially selected in a predetermined order or in a successive manner as indicated in the sequence table. The selected communication station switches to the interference avoidance operation mode and issues instructions for radar wave detection and DFS based on a radar wave detection for a predetermined period of time. Further, the communication station currently obliged to issue instructions for radar wave detection and DFS transfers the obligation to the subsequently obliged communication station by a nonprocedural method or by performing a predetermined acknowledgment procedure.

This section describes the operation that the wireless communication apparatus 100 performs in the interference avoidance operation mode.

E-1. Transferring the Obligation by Executing a Nonprocedural Method in Accordance with the Sequence Table FIG. 13 schematically shows a typical functional configuration of the central control section 103 operating in the interference avoidance operation mode. In the example shown in FIG. 13, the wireless communication apparatus 100 selects the subsequently obliged communication station by executing a nonprocedural method in accordance with the sequence table and transfers the obligation by a nonprocedural method.

As indicated in FIG. 13, a wireless transmission/reception control section 103-a, which controls a normal wireless data transmission operation, and a radar wave detection control section 103-b operate within the central control section 103 while the interference avoidance operation mode prevails.

Upon receipt of a radar wave detection signal from the radar wave detection section 114, the radar wave detection control section 103-b notifies the wireless transmission/reception control section 103-a of such a signal reception. The wireless transmission/reception control section 103-a includes a DFS control section 103-c, and performs, in response to the reception of the radar wave detection signal, an employed frequency change operation for the wireless transmission section 106 and wireless reception section 110 in the local station and a process for creating and transmitting command data for changing the employed frequency of a remote station.

Further, the radar wave detection control section 103-b includes a sequence table management section 103-d and a timer 103-e. The sequence table describes, for instance, the order in which various communication stations perform an interference avoidance operation and the length of time for performing such an operation in accordance with an agreement reached by communication stations operating in the same communication range. When the radar wave detection control section 103-b notes a count reached by the timer 103e and detects the lapse of the time during which the local station fulfills the obligation in the interference avoidance operation mode, it acquires the information about the subsequently obliged communication station from the sequence table management section 103-d, and conveys the acquired information to the wireless transmission/reception control section 103-a. The wireless transmission/reception control section 103-a transfers the obligation to the subsequently obliged communication station, which should fulfill the obligation, and reverts to the normal operation mode.

Figure 14:
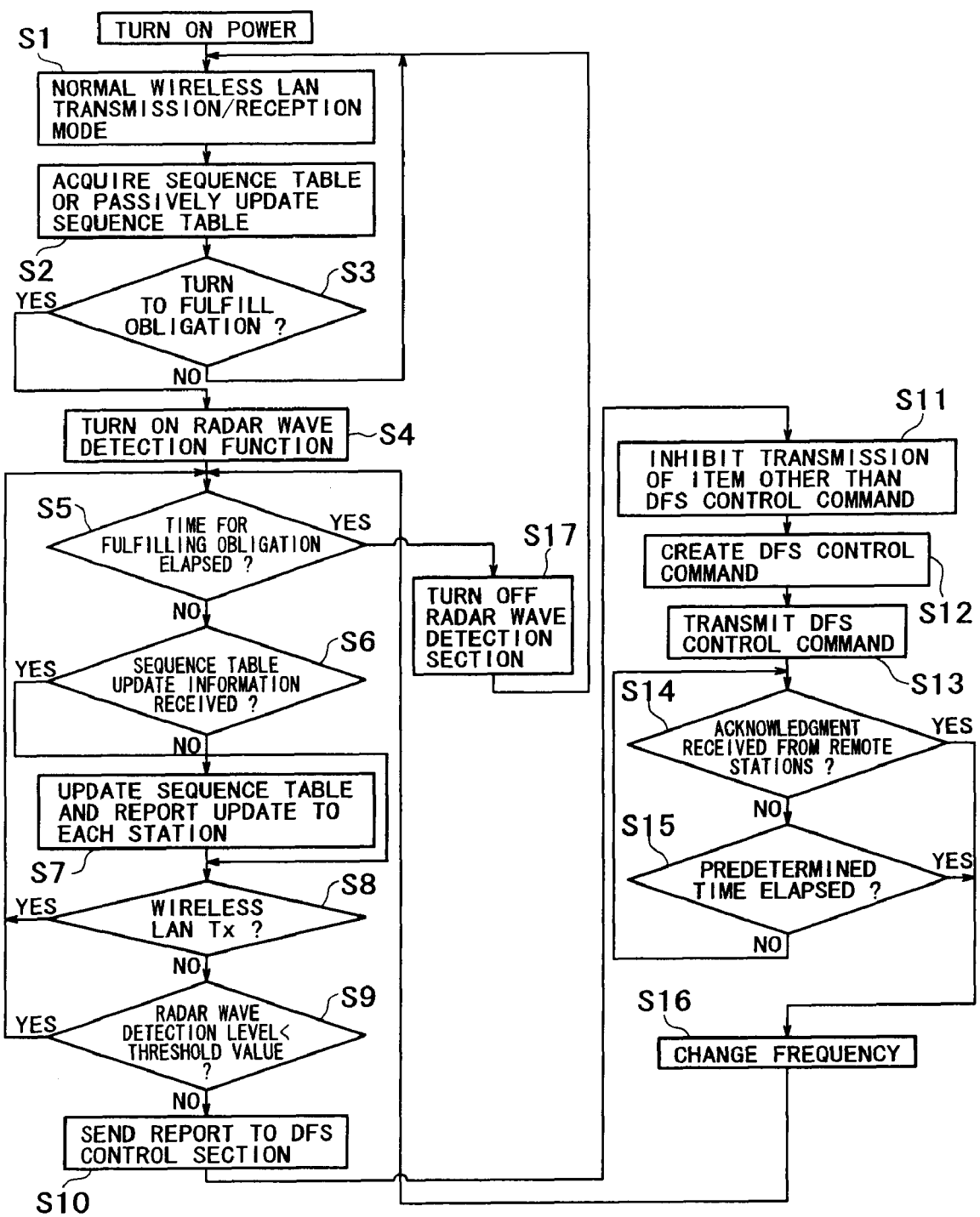
FIG. 14 is a flowchart illustrating a network operation that is performed by the central control section shown in FIG. 13.

FIG. 14 is a flowchart illustrating an operation that the wireless communication apparatus 100 performs in the above case. This operation is performed when the central control section 103 executes a predetermined executable instruction program that is stored in the information storage section.

When the wireless communication apparatus 100 turns on and participates in the wireless network, it first runs in the normal operation mode, which is used to perform a primary wireless data transmission operation (step S1).

The order in which the obligation is fulfilled to issue instructions for radar wave detection and DFS is determined in accordance with an agreement that is reached by the communication stations existing in the wireless network in which the local station has entered. The wireless communication apparatus 100 acquires the sequence table, which describes the above-mentioned order, or passively updates the sequence table (step S2).

The wireless communication apparatus 100 then references the sequence table, becomes aware that it is the local station's turn to fulfill the obligation (step S3), starts the local radar wave detection section 114, and switches to the interference avoidance operation mode (step S4). The radar wave detection control section 103-b operates till the lapse of the time during which the local station has to fulfill the obligation (step S5).

Upon receipt of sequence table update information from a surrounding station (step S6), the radar wave detection control section 103-b locally updates the sequence table and reports such a sequence table update to the surrounding stations (step S7). If normal wireless transmission data comes from a communications protocol upper-level layer, the radar wave detection control section 103-b refrains from performing a process until the time for fulfilling the obligation elapses (step S8). If the radar wave detection level exceeds a predetermined threshold level (step S9), the radar wave detection control section 103-b notifies the DFS control section 103-c of such an event (step S10).

The wireless transmission/reception control section 103-a inhibits the transmission of an item other than a DFS control command (step S11). The DFS control section 103-c creates command data for a frequency change (step S12). Changed frequency channel number data is written within the command data. The DFS control section 103-c then transmits the created command data to all the surrounding stations (step S13).

When an acknowledgment is received from the surrounding stations within a predetermined period of time (step S14) or a predetermined period of time elapses (step S15), the DFS control section 103-c changes the frequency for use in the wireless transmission section 106 and wireless reception section 110 to a frequency that agrees with a frequency channel designated by the command data (step S16). When the surrounding stations can no longer receive a periodic beacon signal from the wireless communication apparatus 100, they detect that the employed frequency is changed.

After the lapse of the time during which the local station has to fulfill the obligation (step S5), the local station turns off the radar wave detection section 104 (step S17) to switch to the normal operation mode.

Figure 15:
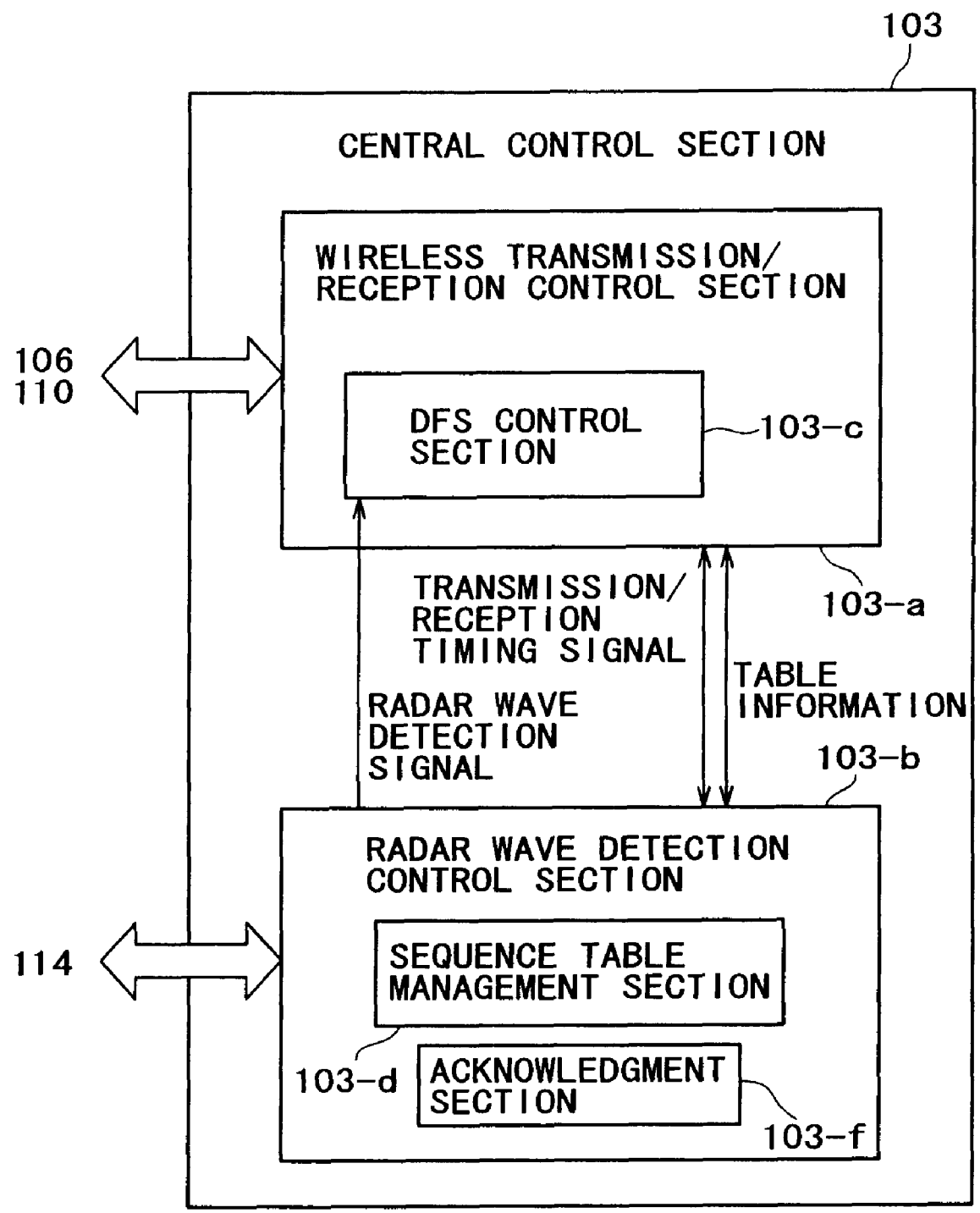
FIG. 15 schematically shows another typical functional configuration of the central control section that is operating in the interference avoidance operation mode.

E-2. Transferring the Obligation by Using an Acknowledgment in Accordance with the Sequence Table FIG. 15 schematically shows another typical functional configuration of the central control section 103 operating in the interference avoidance operation mode. The central control section 103 in FIG. 15 differs from the counterpart in FIG. 13. In FIG. 13, the local station transfers the obligation by a nonprocedural method when it notes the count reached by the timer 103-e and detects the lapse of the time for fulfilling the obligation in the interference avoidance operation mode. In FIG. 15, on the other hand, the obligation is transferred by using an acknowledgment. Therefore, an acknowledgment section 103-f is provided to check whether the obligation transfer destination has acknowledged.

Figure 16:
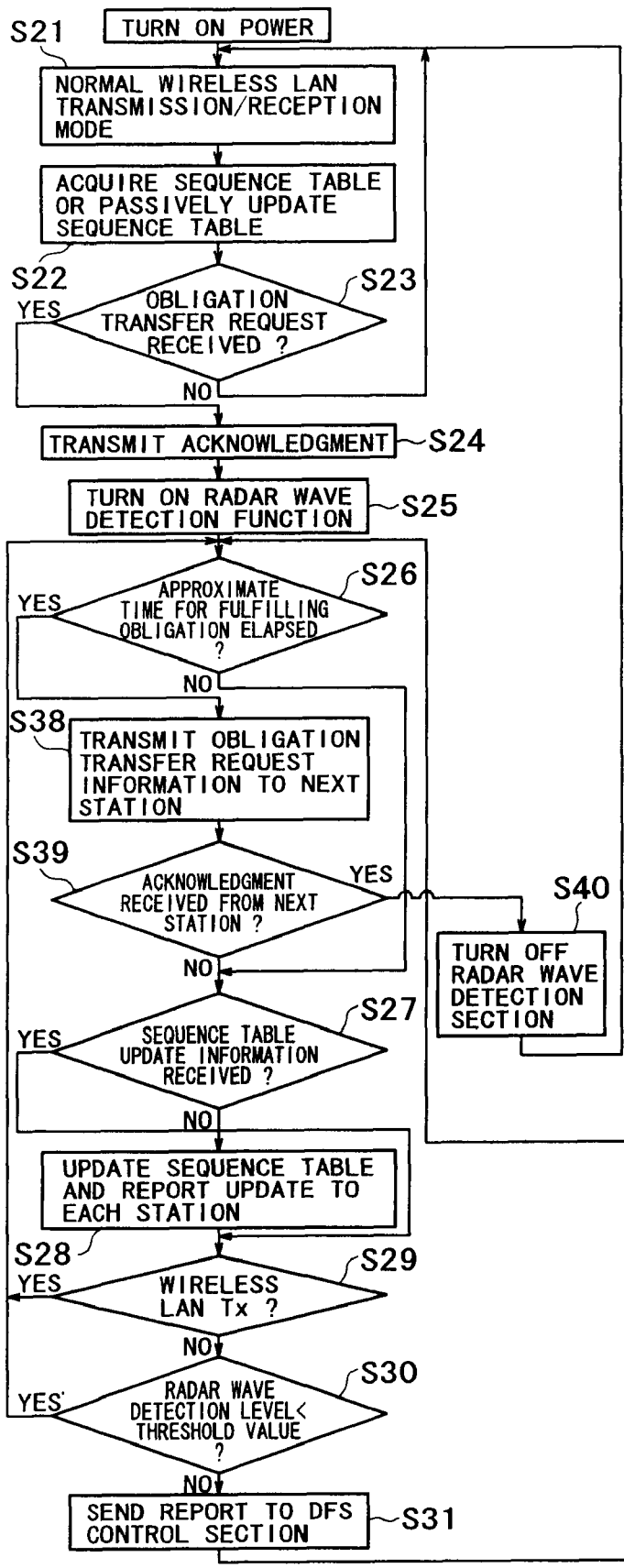
FIG. 16 is a flowchart illustrating a network operation that is performed by the central control section shown in FIG. 15.

FIG. 16 is a flowchart illustrating an operation that the wireless communication apparatus 100 performs in the above case. This operation is performed when the central control section 103 executes a predetermined executable instruction program that is stored in the information storage section.

When the wireless communication apparatus 100 turns on and participates in the wireless network, it first runs in the normal operation mode, which is used to perform a primary wireless data transmission operation (step S21).

The order in which the obligation is fulfilled to issue instructions for radar wave detection and DFS is determined in accordance with an agreement that is reached by the communication stations existing in the wireless network in which the local station has entered. The wireless communication apparatus 100 acquires the sequence table, which describes the above-mentioned order, or passively updates the sequence table (step S22).

Upon receipt of an obligation transfer request from a communication station that is currently obliged to issue instructions for radar wave detection and DFS (step S23), the wireless communication apparatus 100 transmits an acknowledgment (step S24), and starts the local radar wave detection section 114 to switch to the interference avoidance operation mode (step S25). The radar wave detection control section 103-b operates till the lapse of the time during which the local station has to fulfill the obligation (step S26).

Upon receipt of sequence table update information from a surrounding station (step S27), the radar wave detection control section 103-b locally updates the sequence table and reports such a sequence table update to the surrounding stations (step S28). If normal wireless transmission data comes from a communications protocol upper-level layer, the radar wave detection control section 103-b refrains from performing a process until the time for fulfilling the obligation elapses (step S29). If the radar wave detection level exceeds a predetermined threshold level (step S30), the radar wave detection control section 103-b notifies the DFS control section 103-c of such an event (step S31).

The wireless transmission/reception control section 103-a inhibits the transmission of an item other than a DFS control command (step S32). The DFS control section 103-c creates command data for a frequency change (step S33). Changed frequency channel number data is written within the command data. The DFS control section 103-c then transmits the created command data to all the surrounding stations (step S34).

When an acknowledgment is received from the surrounding stations within a predetermined period of time (step S35) or a predetermined period of time elapses (step S36), the DFS control section 103-c changes the frequency for use in the wireless transmission section 106 and wireless reception section 110 to a frequency that agrees with a frequency channel designated by the command data (step S37). When the surrounding stations can no longer receive a periodic beacon signal from the wireless communication apparatus 100, they detect that the employed frequency is changed.

After the lapse of the time during which the local station has to fulfill the obligation (step S36), the local station transmits request information to a communication station that is now obliged to issue instructions for radar wave detection and DFS (step S38). Upon receipt of an acknowledgment from the communication station to which the request information was transmitted (step S39), the local station turns off the radar wave detection section 104 (step S40) to switch to the normal operation mode.

E-3. Transferring the Obligation to Sequentially Selected Communication Stations by Using an Acknowledgment FIG. 17 schematically shows another typical functional configuration of the central control section 103 operating in the interference avoidance operation mode. As is the case shown in FIG. 15, the central control section 103 includes the acknowledgment section 103-f, which checks whether the obligation transfer destination has acknowledged. However, the central control section 103 in FIG. 17 differs from the counterpart in FIG. 15 in that the former includes a neighboring station list management section 103-g and a next-station selection section 103-h, which are used instead of the sequence table management section 103-d to select an arbitrary communication station as the obligation transfer destination.

Figure 18:
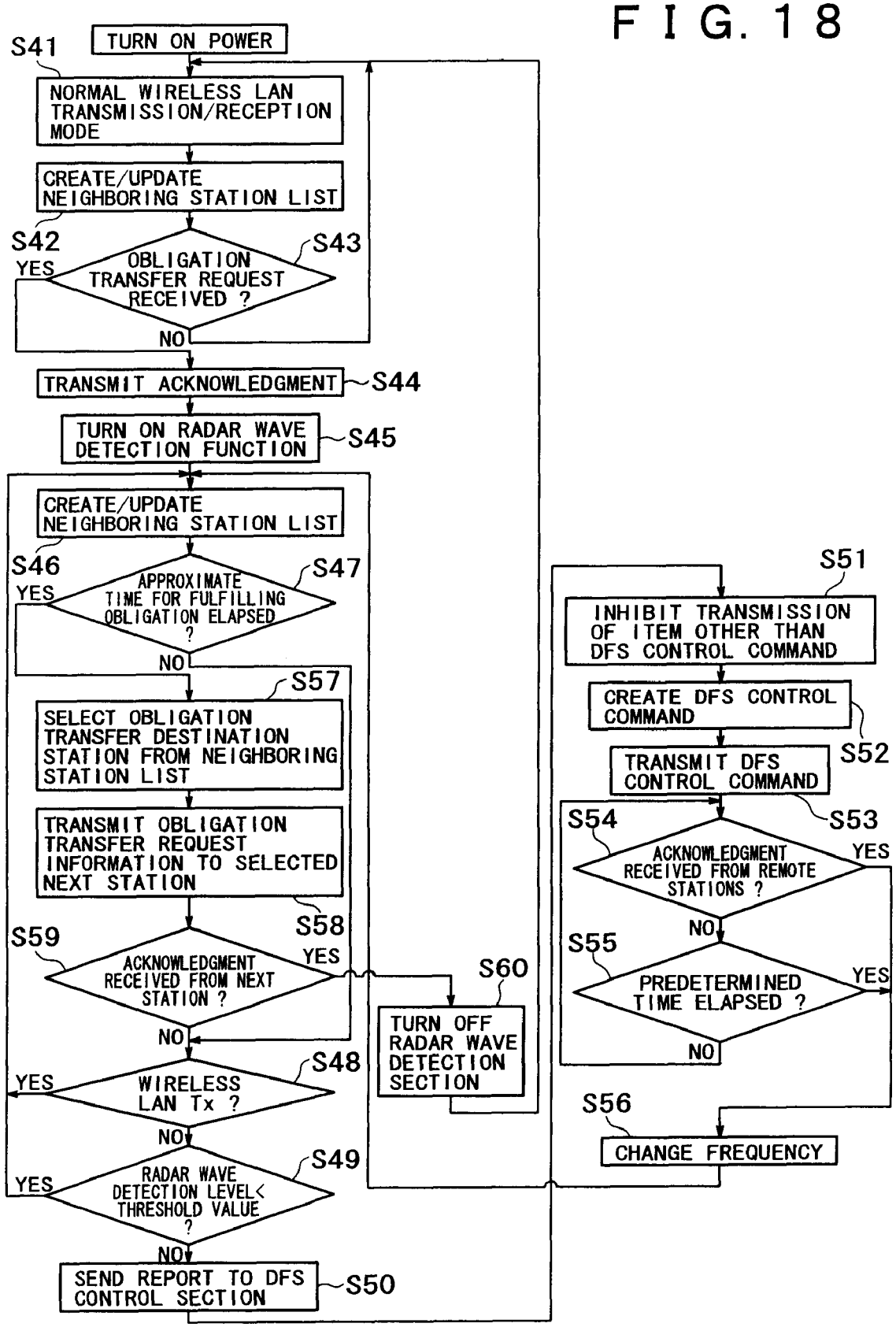
FIG. 18 is a flowchart illustrating a network operation that is performed by the central control section shown in FIG. 17.

FIG. 18 is a flowchart illustrating an operation that the wireless communication apparatus 100 performs in the above case. This operation is performed when the central control section 103 executes a predetermined executable instruction program that is stored in the information storage section.

When the wireless communication apparatus 100 turns on and participates in the wireless network, it first runs in the normal operation mode, which is used to perform a primary wireless data transmission operation (step S41). Next, it autonomously creates a neighboring station list and autonomously updates the list in accordance with the participation of a new surrounding station in the network and the disassociation of a surrounding station from the network (step S42).

Upon receipt of an obligation transfer request from a communication station that is currently obliged to issue instructions for radar wave detection and DFS (step S43), the wireless communication apparatus 100 transmits an acknowledgment (step S44), and starts the local radar wave detection section 114 to switch to the interference avoidance operation mode (step S45). Even in the interference avoidance operation mode, the wireless communication apparatus 100 autonomously creates a neighboring station list and successively updates the list in accordance with the participation of a new surrounding station in the network and the disassociation of a surrounding station from the network (step S46). The radar wave detection control section 103-b operates till the lapse of the time during which the local station has to fulfill the obligation (step S47).

If normal wireless transmission data comes from a communications protocol upper-level layer, the radar wave detection control section 103-b refrains from performing a process until the time for fulfilling the obligation elapses (step S48). If the radar wave detection level exceeds a predetermined threshold level (step S49), the radar wave detection control section 103-b notifies the DFS control section 103-c of such an event (step S50).

The wireless transmission/reception control section 103-a inhibits the transmission of an item other than a DFS control command (step S51). The DFS control section 103-c creates command data for a frequency change (step S52). Changed frequency channel number data is written within the command data. The DFS control section 103-*c* then transmits the created command data to all the surrounding stations (step S53).

When an acknowledgment is received from the surrounding stations within a predetermined period of time (step S54) or a predetermined period of time elapses (step S55), the DFS control section 103-*c* changes the frequency for use in the wireless transmission section 106 and wireless reception section 110 to a frequency that agrees with a frequency channel designated by the command data (step S56). When the surrounding stations can no longer receive a periodic beacon signal from the wireless communication apparatus 100, they detect that the employed frequency is changed.

After the lapse of the time during which the local station has to fulfill the obligation (step S47), the local station selects from the neighboring station list the next communication station that should fulfill the obligation to issue instructions for radar wave detection and DFS (step S57). The local station then transmits obligation transfer request information to the selected communication station (step S58). Upon receipt of an acknowledgment from the communication station to which the request information was transmitted (step S59), the local station turns off the radar wave detection section 104 (step S60) to switch to the normal operation mode.

Figure 19:
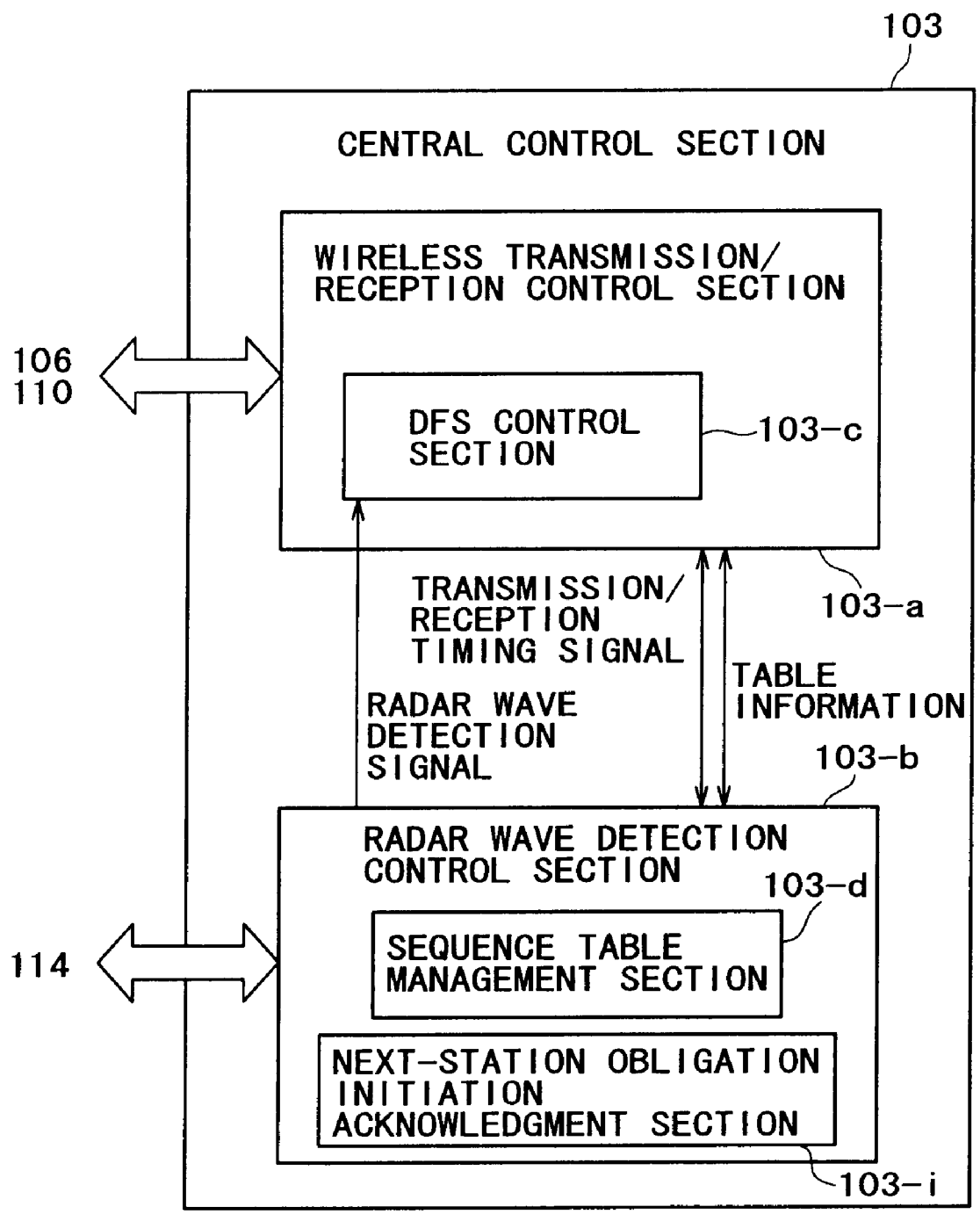
FIG. 19 schematically shows another typical functional configuration of the central control section that is operating in the interference avoidance operation mode.

E-4. Transferring the Obligation in Accordance with the Sequence Table and Confirming that the Next Station Begins to Fulfill the Obligation FIG. 19 schematically shows another typical functional configuration of the central control section 103 operating in the interference avoidance operation mode. The central control section 103 in FIG. 19 differs from the counterpart in FIG. 15. The central control section 103 shown in FIG. 15 includes the acknowledgment section 103-*f*, which checks whether the obligation transfer destination has acknowledged. However, the central control section 103 shown in FIG. 19 includes a next-station obligation initiation acknowledgment section 103-*i*, which checks whether the obligation transfer destination has begun to fulfill the obligation, that is, whether the obligation transfer destination has started a radar wave detection operation.

FIG. 20 is a flowchart illustrating an operation that the wireless communication apparatus 100 performs in the above case. This operation is performed when the central control section 103 executes a predetermined executable instruction program that is stored in the information storage section.

When the wireless communication apparatus 100 turns on and participates in the wireless network, it first runs in the normal operation mode, which is used to perform a primary wireless data transmission operation (step S61).

The order in which the obligation is fulfilled to issue instructions for radar wave detection and DFS is determined in accordance with an agreement that is reached by the communication stations existing in the wireless network in which the local station has entered. The wireless communication apparatus 100 acquires the sequence table, which describes the above-mentioned order, or passively updates the sequence table (step S62).

Upon receipt of an obligation transfer request from a communication station that is currently obliged to issue instructions for radar wave detection and DFS (step S63), the wireless communication apparatus 100 starts the local radar wave detection section 114 to switch to the interference avoidance operation mode (step S64). The wireless communication apparatus 100 then transmits an acknowledgment to the requesting communication station to indicate that it has begun to fulfill the obligation (step S65). Its radar wave detection control section 103-*b* operates till the lapse of the time during which the local station has to fulfill the obligation (step S66).

Upon receipt of sequence table update information from a surrounding station (step S67), the radar wave detection control section 103-*b* locally updates the sequence table and reports such a sequence table update to the surrounding stations (step S68). If normal wireless transmission data comes from a communications protocol upper-level layer, the radar wave detection control section 103-*b* refrains from performing a process until the time for fulfilling the obligation elapses (step S69). If the radar wave detection level exceeds a predetermined threshold level (step S70), the radar wave detection control section 103-*b* notifies the DFS control section 103-*c* of such an event (step S71).

The wireless transmission/reception control section 103-*a* inhibits the transmission of an item other than a DFS control command (step S72). The DFS control section 103-*c* creates command data for a frequency change (step S73). Changed frequency channel number data is written within the command data. The DFS control section 103-*c* then transmits the created command data to all the surrounding stations (step S74).

When an acknowledgment is received from the surrounding stations within a predetermined period of time (step S75) or a predetermined period of time elapses (step S76), the DFS control section 103-*c* changes the frequency for use in the wireless transmission section 106 and wireless reception section 110 to a frequency that agrees with a frequency channel designated by the command data (step S77). When the surrounding stations can no longer receive a periodic beacon signal from the wireless communication apparatus 100, they detect that the employed frequency is changed.

After the lapse of the time during which the local station has to fulfill the obligation (step S66), the local station transmits request information to a communication station that is now obliged to issue instructions for radar wave detection and DFS (step S78). Upon receipt of an acknowledgment from the communication station to which the request information was transmitted (step S79), the local station turns off the radar wave detection section 104 (step S70) to switch to the normal operation mode.

Figure 21:
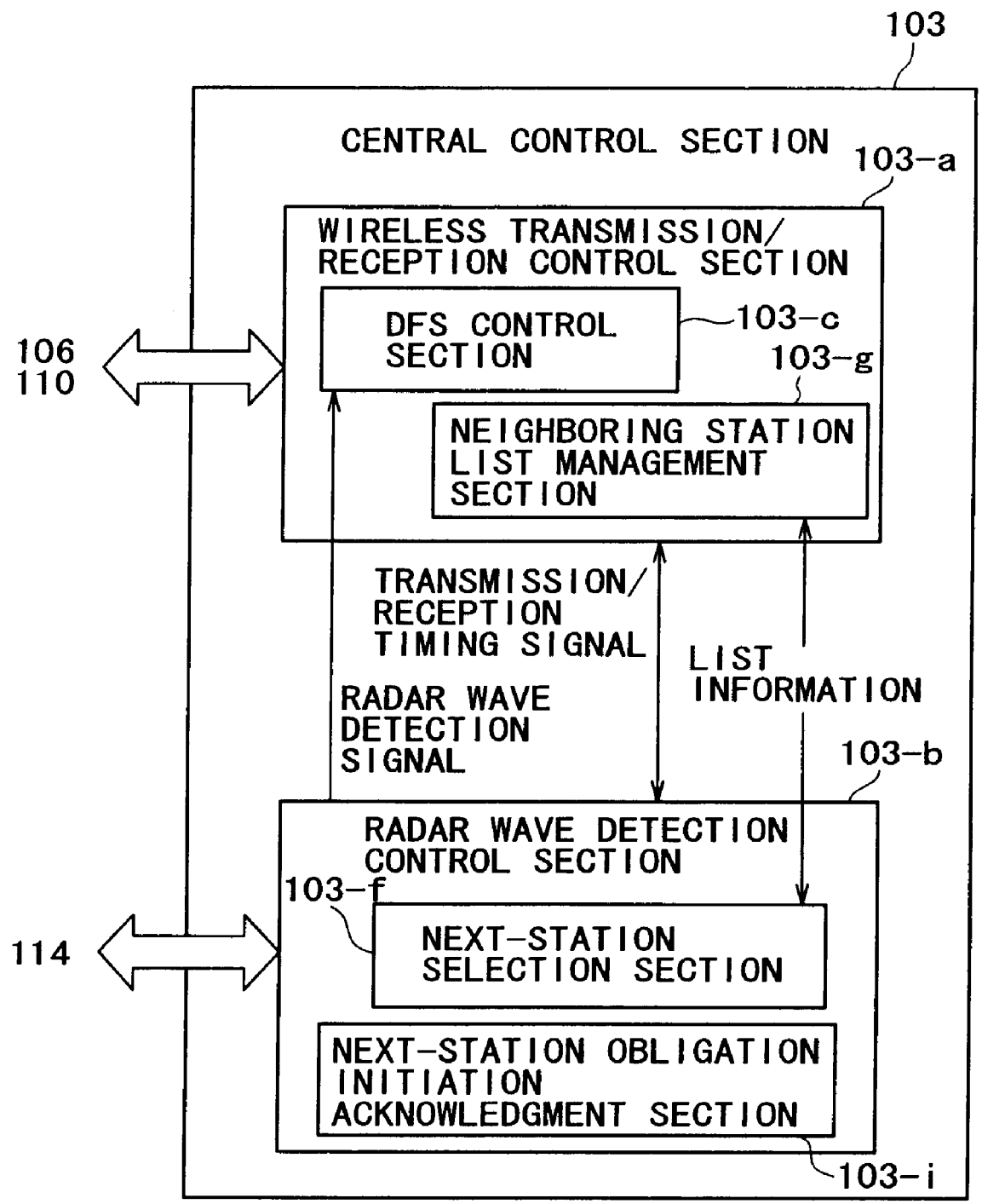
FIG. 21 schematically shows another typical functional configuration of the central control section that is operating in the interference avoidance operation mode.

E-5. Transferring the Obligation to Sequentially Selected Communication Stations and Confirming that the Next Station Begins to Fulfill the Obligation FIG. 21 schematically shows another typical functional configuration of the central control section 103 operating in the interference avoidance operation mode. The central control section 103 in FIG. 21 differs from the counterpart in FIG. 17. The central control section 103 shown in FIG. 17 includes the acknowledgment section 103-*f*, which checks whether the obligation transfer destination has acknowledged. However, the central control section 103 shown in FIG. 21 includes a next-station obligation initiation acknowledgment section 103-*i*, which checks whether the obligation transfer destination has begun to fulfill the obligation, that is, whether the obligation transfer destination has started a radar wave detection operation.

Figure 22:
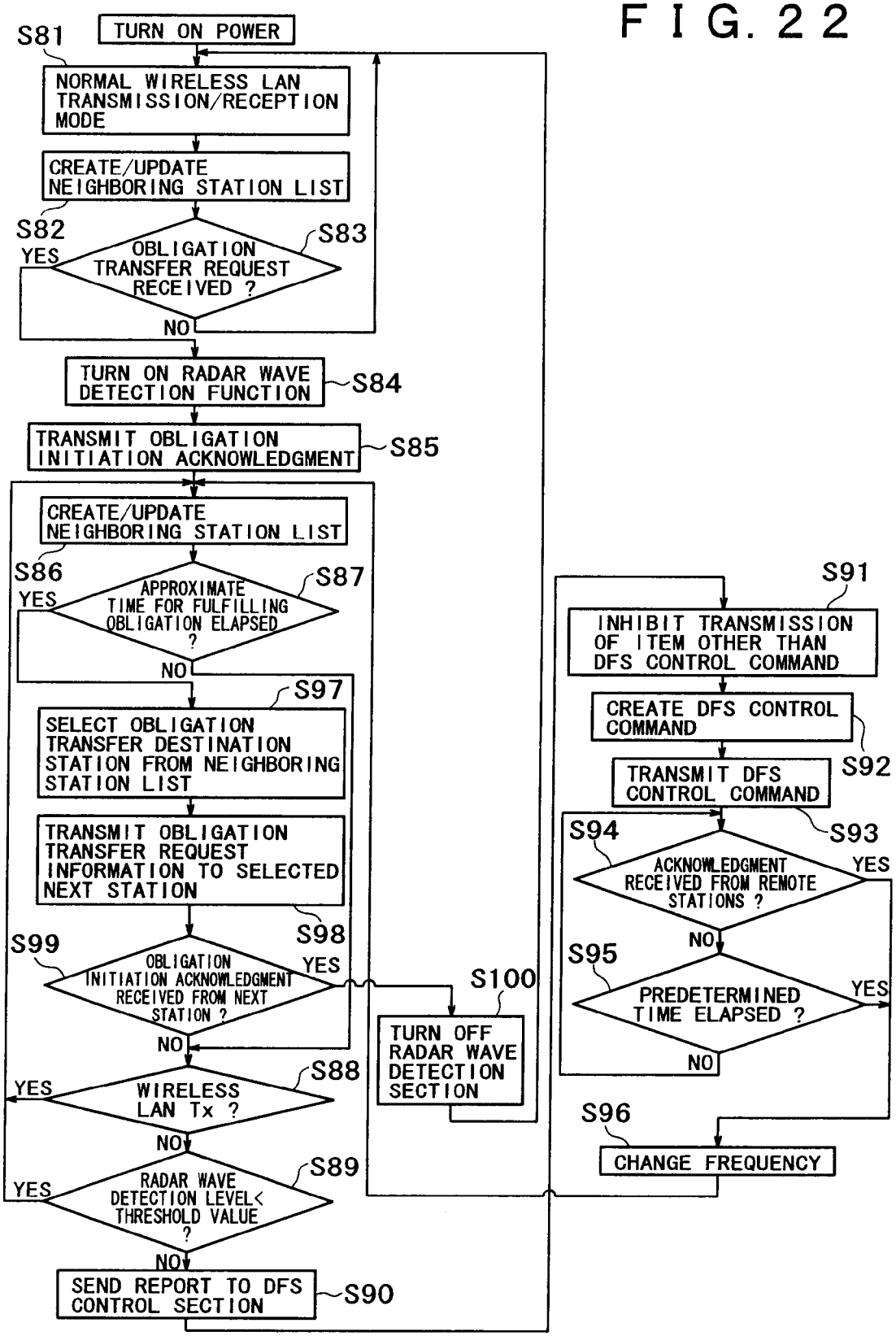
FIG. 22 is a flowchart illustrating a network operation that is performed by the central control section shown in FIG. 21.
Figure 23:
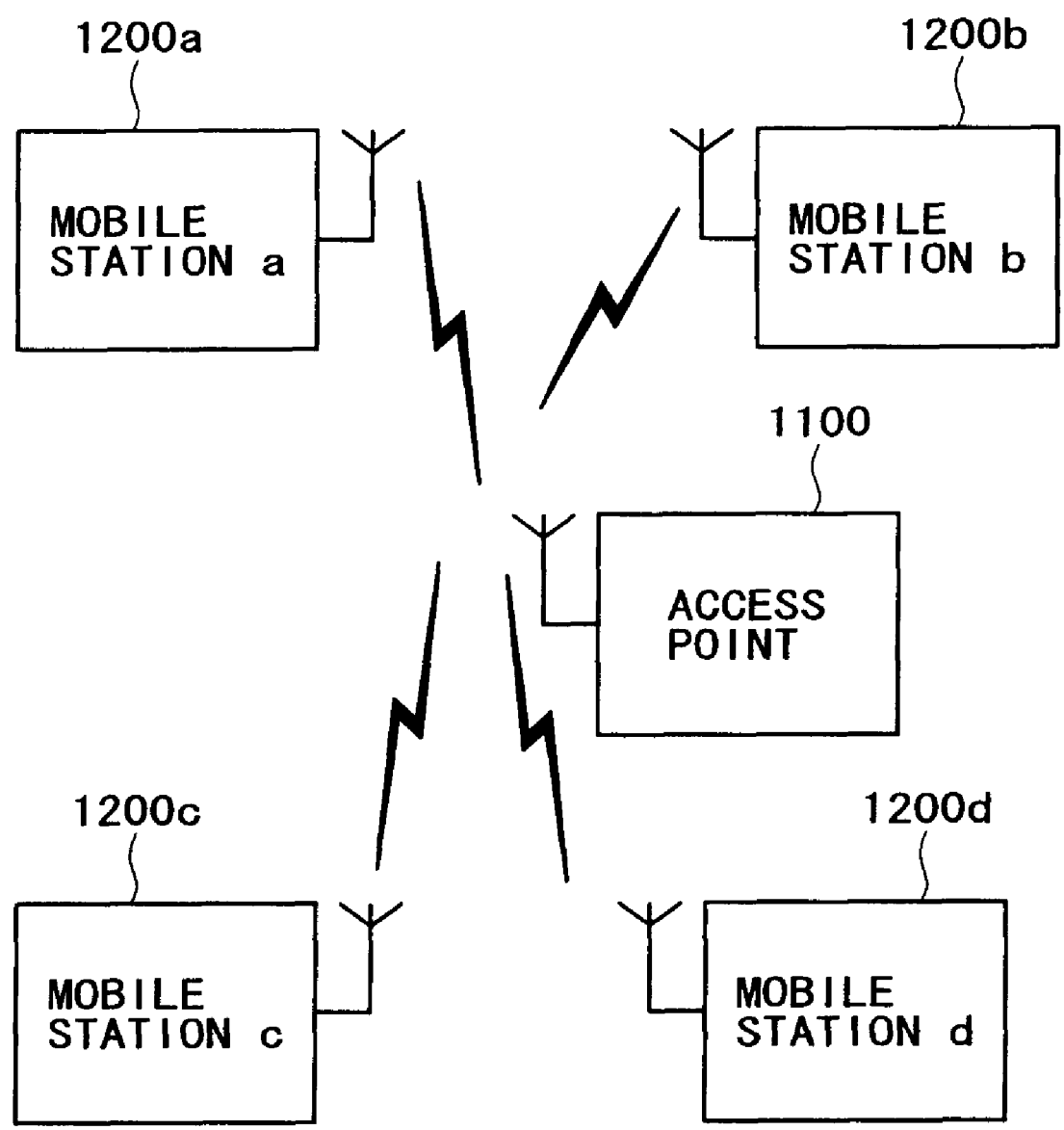
FIG. 23 shows a typical conventional configuration of a wireless LAN network.
Figure 24:
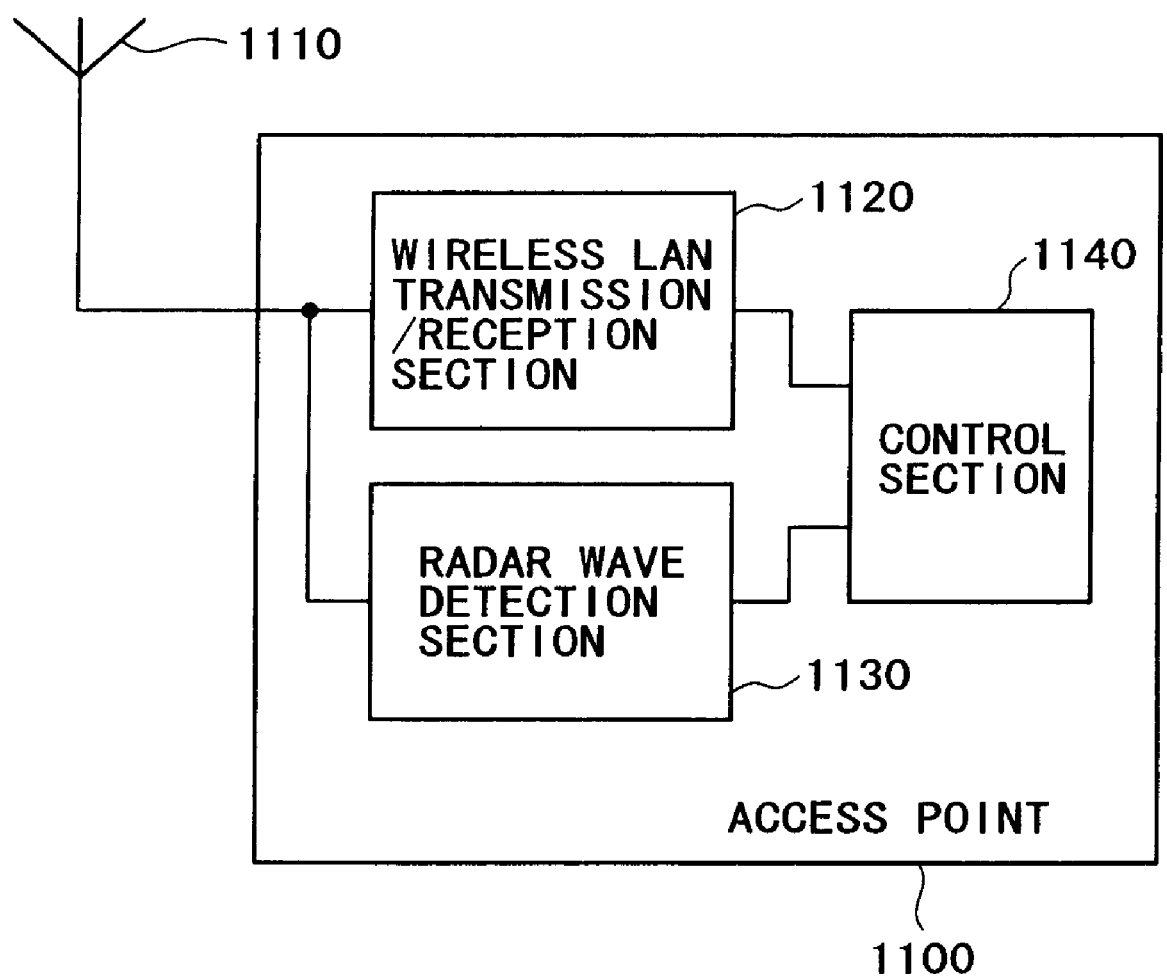
FIG. 24 schematically shows a typical conventional functional configuration of an access point.

FIG. 22 is a flowchart illustrating an operation that the wireless communication apparatus 100 performs in the above case. This operation is performed when the central control section 103 executes a predetermined executable instruction program that is stored in the information storage section.

When the wireless communication apparatus 100 turns on and participates in the wireless network, it first runs in the normal operation mode, which is used to perform a primary wireless data transmission operation (step S81). Next, it autonomously creates a neighboring station list and successively updates the list in accordance with the participation of a new surrounding station in the network and the disassociation of a surrounding station from the network (step S82).

Upon receipt of an obligation transfer request from a communication station that is currently obliged to issue instructions for radar wave detection and DFS (step S83), the wireless communication apparatus 100 starts the local radar wave detection section 114 to switch to the interference avoidance operation mode (step S84). Next, the wireless communication apparatus 100 transmits an acknowledgment to the requesting communication station to indicate that it has begun to fulfill the obligation (step S85). Even in the interference avoidance operation mode, the wireless communication apparatus 100 autonomously creates a neighboring station list and successively updates the list in accordance with the participation of a new surrounding station in the network and the disassociation of a surrounding station from the network (step S86). The radar wave detection control section 103-b operates till the lapse of the time during which the local station has to fulfill the obligation (step S87).

If normal wireless transmission data comes from a communications protocol upper-level layer, the radar wave detection control section 103-b refrains from performing a process until the time for fulfilling the obligation elapses (step S88). If the radar wave detection level exceeds a predetermined threshold level (step S89), the radar wave detection control section 103-b notifies the DFS control section 103-c of such an event (step S90).

The wireless transmission/reception control section 103-a inhibits the transmission of an item other than a DFS control command (step S91). The DFS control section 103-c creates command data for a frequency change (step S92). Changed frequency channel number data is written within the command data. The DFS control section 103-c then transmits the created command data to all the surrounding stations (step S93).

When an acknowledgment is received from the surrounding stations within a predetermined period of time (step S94) or a predetermined period of time elapses (step S95), the DFS control section 103-c changes the frequency for use in the wireless transmission section 106 and wireless reception section 110 to a frequency that agrees with a frequency channel designated by the command data (step S96). When the surrounding stations can no longer receive a periodic beacon signal from the wireless communication apparatus 100, they detect that the employed frequency is changed.

After the lapse of the time during which the local station has to fulfill the obligation (step S87), the local station selects from the neighboring station list the next communication station that should fulfill the obligation to issue instructions for radar wave detection and DFS (step S97). The local station then transmits obligation transfer request information to the selected communication station (step S98). Upon receipt of an acknowledgment from the communication station to which the request information was transmitted (step S99), the local station turns off the radar wave detection section 104 (step S100) to switch to the normal operation mode.

While the present invention has been described in conjunction with specific preferred embodiments of the present invention, persons of skill in the art will appreciate that variations may be made without departure from the scope and spirit of the invention.

An autonomous distributed wireless network according to a primary embodiment has been described. In the autonomous distributed wireless network, each communication station sets its local communication range when it controls the access to media while avoiding collision in accordance with the detection of transmission signals from the other communication stations. However, the present invention is not limited to such a primary embodiment.

For example, the present invention can also be applied to a case where two or more communication stations comply with predetermined rules to alternately perform the radar wave detection and DFS functions in a time sharing manner even when the employed wireless communication system is not autonomous distributed or not autonomous distributed at all so that an access point or a particular control station governs the other communication stations.

The described embodiments are to be considered in all respects only as illustrative and not restrictive. The scope of the present invention is, therefore, indicated by the appended claims rather than by the foregoing description.

What is claimed is:

1. An ad hoc communication system including two or more communication stations for transmitting and receiving a signal within a frequency band for which radar wave detection is required, comprising:
   at least one communication station configured to operate in an interference avoidance mode to detect a radar wave, the at least one communication station selecting a next channel to be used when radar is detected in a currently used channel, the at least one communication station instructing other communication stations to change an employed carrier frequency in accordance with the radar wave detection; and
   at least one communication station configured to operate in a normal operation mode to change the employed carrier frequency according to a received instruction to change the employed carrier frequency from the at least one communication station operating in the interference avoidance mode, wherein
   the two or more communication stations switch between operating in the interference avoidance mode and the normal operation mode.

2. The ad hoc communication system according to claim 1, wherein the at least one communication station configured to operate in the interference avoidance mode selects the next channel to be used and instructs other communication stations to change the employed carrier frequency when a radar wave with a strength greater than a predetermined threshold is detected.

3. The ad hoc communication system according to claim 1, further comprising one or more communication stations having no radar wave detection functionality and operating exclusively in the normal operation mode.

4. The ad hoc communication system according to claim 1, wherein the at least one communication station configured to operate in the normal operation mode sends an acknowledgement when an instruction to change the employed carrier frequency is received from the at least one communication station operating in the interference avoidance mode.

5. A communication station configured to communicate in an ad hoc communication system and to operate in an interference avoidance mode and a normal operation mode, comprising:
   a wireless transmission unit configured to transmit data on an employed frequency to surrounding communication stations;
   a wireless reception unit configured to receive data on the employed frequency from surrounding communication stations;

a radar wave detection unit configured to continuously monitor incoming transmissions to detect an incoming radar wave; and a central control unit configured to receive, when the communication station is in the interference avoidance mode, an indicator from the radar wave detection unit that an incoming radar wave has been detected and to control the wireless transmission unit to transmit to the surrounding communication stations an instruction to change the employed frequency and configured to receive, when the communication station is in the normal operation mode, an instruction from one of the surrounding communication stations to change the employed frequency, wherein the communication station alternates between operating in the interference avoidance mode and the normal operation mode.

6. The communication station according to claim 5, wherein, when the communication station is operating in the interference avoidance mode and the central control unit receives an indicator from the radar wave detection unit that an incoming radar wave with a strength greater than a predetermined threshold has been detected, the central control unit selects a next channel to be used and controls the wireless transmission unit to transmit to the surrounding communication stations an instruction to change the employed frequency to the selected next channel.

7. The communication station according to claim 5, wherein the central control unit controls the radar wave detection unit to cease operation when the communication station is in the normal operation mode and controls the radar wave detection unit to begin operation when the communication station is in the interference avoidance mode.

8. The communication station according to claim 5, wherein, when the communication station is operating in the normal operation mode and the central control unit receives an instruction from one of the surrounding communication stations to change the employed frequency, the central control unit controls the wireless transmission unit to send an acknowledgement back to the surrounding communication station from which the instruction was received.

9. A method for operating an ad hoc communication system comprising two or more communication stations for transmitting and receiving a signal within a frequency band for which radar wave detection is required, comprising:

operating at least one communication station in an interference avoidance mode in which the at least one communication station operating in the interference avoidance mode detects a radar wave, selects a next channel to be used when radar is detected in a currently used channel, and instructs other communication stations to change an employed carrier frequency in accordance with the radar wave detection;

operating at least one communication station in a normal operation mode in which the at least one communication station operating in the normal operation mode changes the employed carrier frequency according to a received instruction to change the employed carrier frequency from the at least one communication station operating in an interference avoidance mode; and switching the two or more communication stations between operating in the interference avoidance mode and the normal operation mode.

10. The method according to claim 9, wherein the at least one communication station operating in the interference avoidance mode selects the next channel to be used and instructs other communication stations to change the employed carrier frequency when a radar wave is detected with a strength greater than a predetermined threshold.

11. The method according to claim 9, wherein the ad hoc communication system further comprises one or more communication stations having no radar wave detection functionality and operating exclusively in the normal operation mode.

12. The method according to claim 9, wherein the at least one communication station operating in the normal operation mode sends an acknowledgement when an instruction to change the employed carrier frequency is received from the at least one communication station operating in the interference avoidance mode.

13. A non-transitory computer-readable medium having computer-readable instructions thereon, the instructions, when executed by a computer, cause the computer to perform a method for operating a communication station in an ad hoc communication system in an interference avoidance mode and a normal operation mode, the method comprising:

wirelessly transmitting data on an employed frequency to surrounding communication stations;

wirelessly receiving data on the employed frequency from surrounding communication stations, wherein when the communication station is in the interference avoidance mode, the method includes:
continuously monitoring incoming transmissions to detect an incoming radar wave; and
transmitting to the surrounding communication stations an instruction to change the employed frequency when an incoming radar wave has been detected, and when the communication station is in the normal operation mode, the method includes:
receiving an instruction from one of the surrounding communication stations to change the employed frequency.

* * * * *